United States Patent
Lee et al.

(10) Patent No.: US 10,102,811 B2
(45) Date of Patent: *Oct. 16, 2018

(54) METHOD OF DISPLAYING THREE-DIMENSIONAL IMAGE AND DISPLAY APPARATUS USING THE SAME

(71) Applicant: Samsung Display Co., Ltd., Yongin-Si, Gyeonggi-Do (KR)

(72) Inventors: Jun-Pyo Lee, Asan-si (KR); Hyun-Sik Yoon, Asan-si (KR); Hak-Mo Choi, Seoul (KR); Jae-Hyoung Park, Suwon-si (KR); Byung-Kil Jeon, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,947

(22) Filed: Dec. 12, 2017

(65) Prior Publication Data

US 2018/0114494 A1    Apr. 26, 2018

Related U.S. Application Data

(63) Continuation of application No. 13/766,079, filed on Feb. 13, 2013, now Pat. No. 9,875,696.

(30) Foreign Application Priority Data

Mar. 21, 2012    (KR) .......................... 10-2012-0029036

(51) Int. Cl.
*G09G 3/36*    (2006.01)
*G09G 3/20*    (2006.01)
(Continued)

(52) U.S. Cl.
CPC ......... *G09G 3/3413* (2013.01); *G09G 3/3648* (2013.01); *H04N 13/0018* (2013.01);
(Continued)

(58) Field of Classification Search
CPC ............. G09G 1/28; G09G 2320/0209; G09G 2320/02; H04N 13/00; H04N 13/0434; H04N 13/0497
See application file for complete search history.

(56) References Cited

U.S. PATENT DOCUMENTS 9,001,195 B2    4/2015    Nakahata
2005/0179854 A1    8/2005    Sekine et al.
(Continued)

FOREIGN PATENT DOCUMENTS

JP    2004165713 A    6/2004
JP    2005234104 A    9/2005
(Continued)

OTHER PUBLICATIONS

Partial European Search Report for Application No. 13155571.6-1903 dated Sep. 9, 2016.
(Continued)

*Primary Examiner* — Sepehr Azari
(74) *Attorney, Agent, or Firm* — Cantor Colburn LLP

(57) ABSTRACT

A method of displaying a three-dimensional image includes outputting a converted left image generated based on a left image to a pixel of a display panel during a first period, where the converted left image has a grayscale value less than a grayscale value of the left image, outputting the left image to the pixel of the display panel during a second period, outputting a converted right image generated based on a right image to the pixel of the display panel during a third period, where the converted right image has a grayscale value less than a grayscale value of the right image, and
(Continued)

outputting the right image to the pixel of the display panel during a fourth period.

60 Claims, 17 Drawing Sheets

(51) Int. Cl.
    *G09G 3/34*     (2006.01)
    *H04N 13/00*     (2018.01)
    *H04N 13/04*     (2006.01)
    *G09G 3/00*     (2006.01)

(52) U.S. Cl.
    CPC ......... *H04N 13/0438* (2013.01); *G09G 3/003* (2013.01); *G09G 3/2022* (2013.01); *G09G 3/342* (2013.01); *G09G 2310/024* (2013.01); *G09G 2310/0237* (2013.01); *G09G 2320/0209* (2013.01); *G09G 2340/0435* (2013.01); *H04N 13/0434* (2013.01)

(56) References Cited

U.S. PATENT DOCUMENTS

| | | |
|---|---|---|
| 2010/0066820 A1 | 3/2010 | Park et al. |
| 2010/0289974 A1 | 11/2010 | Kim et al. |
| 2010/0302353 A1 | 12/2010 | Lee et al. |
| 2011/0032345 A1 | 2/2011 | Robinson et al. |
| 2011/0096146 A1 | 4/2011 | Hulyalkar et al. |
| 2011/0148863 A1 | 6/2011 | Seo et al. |
| 2011/0169821 A1 | 7/2011 | Ishiguchi |
| 2011/0273463 A1 | 11/2011 | Lee et al. |
| 2011/0279450 A1 | 11/2011 | Seong et al. |
| 2011/0292041 A1 | 12/2011 | Lee et al. |
| 2012/0013719 A1 | 1/2012 | Choi et al. |
| 2012/0019639 A1 | 1/2012 | Chang et al. |
| 2012/0188348 A1 | 7/2012 | Umeda et al. |

FOREIGN PATENT DOCUMENTS

| | | |
|---|---|---|
| JP | 2009271306 A | 11/2009 |
| JP | 2010091782 A | 4/2010 |
| JP | 2011065151 A | 3/2011 |
| JP | 201175746 A | 4/2011 |
| JP | 2011242773 A | 12/2011 |
| KR | 1020110072190 A | 6/2011 |
| KR | 1020110126944 A | 11/2011 |
| WO | 2011155149 A1 | 12/2011 |

OTHER PUBLICATIONS

Korean Office Action for Application No. 10-2012-0029036 dated Aug. 20, 2018 enumerating the above references.

METHOD OF DISPLAYING THREE-DIMENSIONAL IMAGE AND DISPLAY APPARATUS USING THE SAME

This application is a continuation of U.S. patent application Ser. No. 13/766,079, filed on Feb. 13, 2013, which claims priority to Korean Patent Application No. 10-2012-0029036, filed on Mar. 21, 2012, and all the benefits accruing therefrom under 35 U.S.C. § 119, the content of which in its entirety is herein incorporated by reference.

BACKGROUND

1. Field

Exemplary embodiments of the invention relate to a method of displaying a three-dimensional ("3D") image and a display apparatus using the method. More particularly, exemplary embodiments of the invention relate to a method of displaying a 3D image with improved display quality and a display apparatus using the method.

2. Description of the Related Art

Generally, a liquid crystal display apparatus displays a two-dimensional ("2D") image. Recently, as a demand for displaying a 3D image has been increasing in video game and movie industries, the liquid crystal display apparatus has been developed to display the 3D image.

Generally, a stereoscopic image display apparatus displays the 3D image using a binocular parallax between two eyes of a human. For example, as two eyes of a human are spaced apart from each other, images viewed by two eyes of a viewer at different angles are inputted to a human brain. The human brain mixes the images such that the viewer may recognize the stereoscopic image.

The stereoscopic image display device may be divided into a stereoscopic type and an auto-stereoscopic type depending on whether a viewer wears an extra spectacle or not. The stereoscopic type may include a polarizing glass type and a shutter glass type, for example. In the polarizing glass type, polarizing glasses selectively transmit a left image and a right image to viewer's eyes. In the shutter glass type, a left image and a right image may be temporally divided to be periodically displayed, and a viewer wears shutter glasses which opens and closes a left eye shutter and a right eye shutter in synchronization with the period of the left and right images.

When the viewer watches the 3D image, a crosstalk, which means that a left image is shown in a right eye or a right image is shown in a left eye, may occur.

When image data, an operation of the shutter glasses and an operation of a backlight assembly are adjusted to effectively prevent the crosstalk, a luminance of the display panel may decrease. Thus, display quality of the 3D image may be deteriorated.

SUMMARY

Exemplary embodiments of the invention provide a method of displaying a three-dimensional ("3D") image with improved display quality of the 3D image.

Exemplary embodiments of the invention provide a display apparatus for performing the method of displaying the 3D image.

In an exemplary embodiment of a method of displaying a 3D image according to the invention, the method includes outputting a converted left image generated based on a left image to a pixel of a display panel during a first period, outputting the left image to the pixel of the display panel during a second period, outputting a converted right image generated based on a right image to the pixel of the display panel during a third period and outputting the right image to the pixel of the display panel during a fourth period. In such an embodiment, the converted left image has a grayscale value less than a grayscale value of the left image, and the converted right image has a grayscale value less than a grayscale value of the right image.

In an exemplary embodiment, the method may further include sequentially providing light to a plurality of display blocks of the display panel along a scanning direction of the display blocks.

In an exemplary embodiment, the sequentially providing the light to the display blocks may include temporally providing the light in the second period and temporally providing the light in the fourth period.

In an exemplary embodiment, the method may further include adjusting an operation of a light converting element based on the left image and the right image, where the light converting element selectively blocks light corresponding to the left image and the right image.

In an exemplary embodiment, the light converting element may include light converting glasses.

In an exemplary embodiment, the light converting element may include a retarder unit disposed on the display panel.

In an exemplary embodiment, the converted left and right images may be generated by multiplying the grayscale values of the left and right images by a converting value.

In an exemplary embodiment, the converting value may be determined based on the grayscale values of the left and right images.

In an exemplary embodiment, the converted left and right images may be generated using a lookup table including a plurality of grayscale values corresponding to the grayscale values of the left and right images.

In an exemplary embodiment of a method of displaying a 3D image according to the invention, the method includes outputting a converted left image generated based on a left image to a pixel of a display panel during a first period, outputting the left image to the pixel of the display panel during a second period, outputting a converted right image generated based on a right image to the pixel of the display panel during a third period and outputting the right image to the pixel of the display panel during a fourth period. In such an embodiment, the converted left image has a grayscale value greater than a grayscale value of the left image, and the converted right image has a grayscale value greater than a grayscale value of the right image.

In an exemplary embodiment, the method may further include sequentially providing light to a plurality of display blocks of the display panel along a scanning direction of the display blocks.

In an exemplary embodiment, the sequentially providing the light to the display blocks may include temporally providing the light in the second period and temporally providing the light in the fourth period.

In an exemplary embodiment, the method may further include adjusting an operation of a light converting element based on the left image and the right image, where the light converting element selectively blocks light corresponding to the left image and the right image.

In an exemplary embodiment, the light converting element may include light converting glasses.

In an exemplary embodiment of a method of displaying a 3D image according to the invention, the method includes outputting a left image to a pixel of a display panel during a first period, outputting a converted left image generated based on the left image to the pixel of the display panel during a second period, outputting a right image to the pixel of the display panel during a third period and outputting a converted right image generated based on the right image to the pixel of the display panel during a fourth period. In such an embodiment, the converted left image has a grayscale value less than a grayscale value of the left image, and the converted right image has a grayscale value less than a grayscale value of the right image.

In an exemplary embodiment, the method may further include sequentially providing light to a plurality of display blocks of the display panel along a scanning direction of the display blocks.

In an exemplary embodiment, the sequentially providing the light to the display blocks may include temporally providing the light in an ending portion of the first period and a beginning portion of the second period and temporally providing the light in an ending portion of the third period and a beginning portion of the fourth period.

In the exemplary embodiment, the method may further include adjusting an operation of a light converting element based on the left image and the right image, where the light converting element selectively blocks light corresponding to the left image and the right image.

In an exemplary embodiment, the light converting element may include light converting glasses.

In an exemplary embodiment of a display apparatus according to the invention, the display apparatus includes a display panel including a pixel and a panel driver which outputs a converted left image generated based on a left image to the pixel of the display panel during a first period, outputs the left image to the pixel of the display panel during a second period, outputting a converted right image generated based on a right image to the pixel of the display panel during a third period, and outputs the right image to the pixel of the display panel during a fourth period, where the converted left image has a grayscale value less than a grayscale value of the left image, and the converted right image has a grayscale value less than a grayscale value of the right image.

In an exemplary embodiment, the display apparatus may further include a light source part which provides light to the display panel, where the display panel includes a plurality of display blocks, and the light source part sequentially providing the light to the display blocks of the display panel along a scanning direction of the display blocks.

In an exemplary embodiment, the light source part may temporally provide the light in the second period and may temporally provide the light in the fourth period.

In an exemplary embodiment, the display apparatus may further include a light converting element which selectively blocks light corresponding to the left image and the right image.

In an exemplary embodiment, the light converting element may include light converting glasses.

In an exemplary embodiment, the light converting element may include a retarder unit disposed on the display panel.

In an exemplary embodiment, the panel driver may generate the converted left and right images by multiplying the grayscale values of the left and right images by a converting value.

In an exemplary embodiment, the converting value may be determined based on the grayscale values of the left and right images.

In an exemplary embodiment, the panel driver may generate the converted left and right images using a lookup table including a plurality of grayscale values according to the grayscale values of the left and right images.

In an exemplary embodiment, the panel driver may include a timing controller generating the converted left and right images.

In an exemplary embodiment, the panel driver may include a data driver which generates the converted left and right images.

In an exemplary embodiment of a display apparatus according to the invention, the display apparatus includes a display panel including a pixel, and a panel driver which outputs a converted left image generated based on a left image to the pixel of the display panel during a first period, outputs the left image to the pixel of the display panel during a second period, outputs a converted right image generated based on a right image to the pixel of the display panel during a third period, and outputs the right image to the pixel of the display panel during a fourth period, where the converted left image has a grayscale value greater than a grayscale value of the left image, and the converted right image has a grayscale value greater than a grayscale value of the right image.

In an exemplary embodiment, the display apparatus may further include a light source part which provides light to the display panel, where the display panel includes a plurality of display blocks, and the light source part sequentially provides the light to the display blocks of the display panel along a scanning direction of the display blocks.

In an exemplary embodiment, the light source part may temporally provide the light in the second period and may temporally provide the light in the fourth period.

In an exemplary embodiment, the display apparatus may further include a light converting element which selectively blocks light corresponding to the left image and the right image.

In an exemplary embodiment, the light converting element may include light converting glasses.

In an exemplary embodiment of a display apparatus according to the invention, the display apparatus includes a display panel including a pixel, and a panel driver which outputs a left image to the pixel of the display panel during a first period, outputs a converted left image generated based on the left image to the pixel of the display panel during a second period, outputs a right image to the pixel of the display panel during a third period, and outputting a converted right image generated based on the right image to the pixel of the display panel during a fourth period, where the converted left image has a grayscale value less than a grayscale value of the left image, and the converted right image has a grayscale value less than a grayscale value of the right image.

In an exemplary embodiment, the display apparatus may further include a light source part which provides light to the display panel, where the display panel includes a plurality of display blocks, and the light source part sequentially provides the light to the display blocks of the display panel along a scanning direction of the display blocks.

In an exemplary embodiment, the light source part may temporally provide the light in an ending portion of the first period and a beginning portion of the second period and may temporally provide the light in an ending portion of the third period and a beginning portion of the fourth period.

In an exemplary embodiment, the display apparatus may further include a light converting element which selectively blocks light corresponding to the left image and the right image.

In an exemplary embodiment, the light converting element may include light converting glasses.

In an exemplary embodiment of a display apparatus according to the invention, the display apparatus includes a display panel including a pixel, and a panel driver which applies one of left and right images to the pixel during a second period and applies a converted image of the one of the left and right images to the pixel during a first period prior to the second period, where the converted image of the one of the left and right images has a grayscale value less than a grayscale value of the one of the left and right images.

In an exemplary embodiment, the panel driver may generate the converted image by multiplying the grayscale value of the one of the left and right images by a converting value.

In an exemplary embodiment, the converting value may be determined based on the grayscale value of the one of the left and right images.

In an exemplary embodiment, the panel driver may generate the converted image of the one of the left and right images using a lookup table which stores a grayscale value corresponding to the grayscale value of the one of the left and right images.

In an exemplary embodiment, the display apparatus may further include a light source part which provides light to the display panel, and a light source driver which drives the light source part.

In an exemplary embodiment, the light source driver may be connected to the panel driver, and the light source driver may drive the light source part synchronized with an image displayed on the display panel.

In an exemplary embodiment, the light source part may include a plurality of light emitting blocks, and the light emitting blocks may be sequentially driven along a scanning direction of the image displayed on the display panel.

In an exemplary embodiment, the display apparatus may further include a light converting element which selectively or totally blocks light corresponding to the one of the left and the right images.

In an exemplary embodiment, the light converting element may include light converting glasses.

In an exemplary embodiment, the light converting element may include a retarder unit disposed on the display panel.

In an exemplary embodiment of a display apparatus according to the invention, the display apparatus includes a display panel including a pixel and a panel driver which applies one of left and right images to the pixel during a second period and applies a converted image of the one of the left and right images to the pixel during a first period prior to the second period, where the converted image of the one of the left and right images has a grayscale value greater than a grayscale value of the one of the left and right images.

In an exemplary embodiment, the panel driver may generate the converted image by multiplying the grayscale value of the one of the left and right images by a converting value.

In an exemplary embodiment, the converting value may be determined based on the grayscale value of the one of the left and right images.

In an exemplary embodiment, the panel driver may generate the converted image using a lookup table which stores a grayscale value corresponding to the one of the left and right images.

In an exemplary embodiment, the display apparatus may further include a light source part which provides light to the display panel, and a light source driver which drives the light source part.

In an exemplary embodiment, the light source driver may be connected to the panel driver, and the light source driver may drive the light source part synchronized with an image displayed on the display panel.

In an exemplary embodiment, the light source part may include a plurality of light emitting blocks, and the light emitting blocks may be sequentially driven along a scanning direction of the image displayed on the display panel.

In an exemplary embodiment, the display apparatus may further include a light converting element which selectively or totally blocks light corresponding to the one of the left and right images.

In an exemplary embodiment, the light converting element may include light converting glasses.

In an exemplary embodiment, the light converting element may include a retarder unit disposed on the display panel.

According to one or more method of displaying the 3D image and the display apparatus using the method, grayscale values of image data displayed on the display panel are converted such that a crosstalk is effectively prevented and a luminance of the display panel increases. Thus, display quality of the 3D image is improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
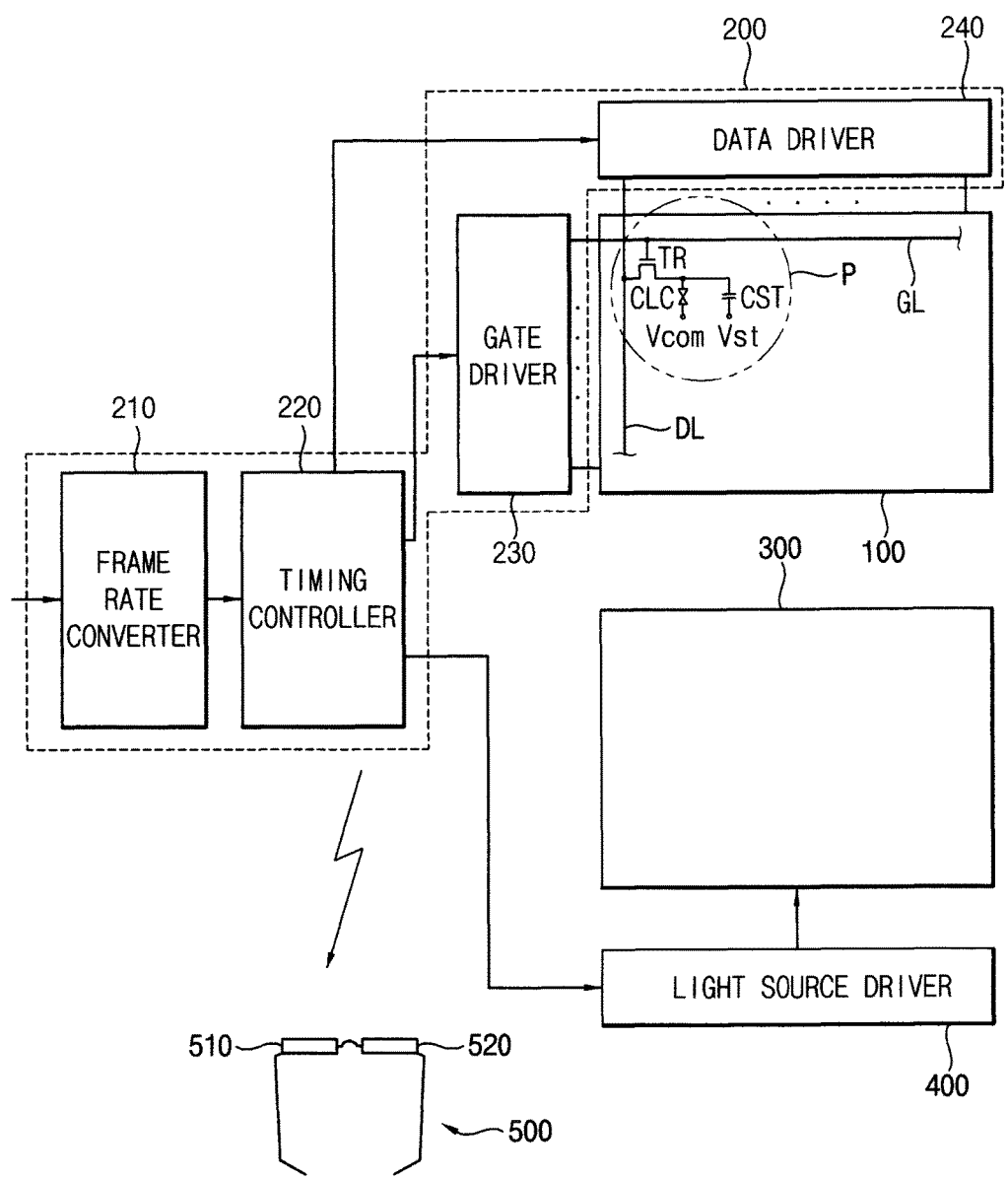
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a block diagram illustrating an exemplary embodiment of a display apparatus according to the invention.

Referring to FIG. 1, the display apparatus includes a display panel 100, a panel driving part 200, a light source part 300, a light source driver 400 and light converting glasses 500.

The display panel 100 includes a plurality of pixels P which displays an image. In an exemplary embodiment, each of the pixels includes a switching element TR electrically connected to a gate line GL and a data line DL, a liquid crystal capacitor CLC connected to the switching element TR and a storage capacitor CST connected to the switching element TR. The pixels P may be disposed substantially in a matrix form. The display panel 100 may include two substrates opposite to each other and a liquid crystal layer disposed between the two substrates.

The display panel 100 may be divided into a plurality of display blocks. In one exemplary embodiment, for example, the display panel 100 may be divided into eight display blocks. In an exemplary embodiment, each of the display blocks may include a plurality of pixels. Longer sides of the display blocks may extend in a direction substantially parallel to the gate line GL. Shorter sides of the display blocks may extend in a direction substantially parallel to the data line DL. The display blocks adjacent to each other may be disposed in the direction substantially parallel to the data line DL.

In an exemplary embodiment, the display panel 100 is divided into eight display blocks as described above, but the invention is not limited thereto.

In such an embodiment, the panel driving part 200 includes a frame rate converter 210, a timing controller 220, a gate driver 230 and a data driver 240.

The frame rate converter 210 receives input image data RGB (shown in FIG. 5) from an external apparatus (not shown). In an exemplary embodiment, the input image data RGB may include red image data R, green image data G and blue image data B.

Figure 5:
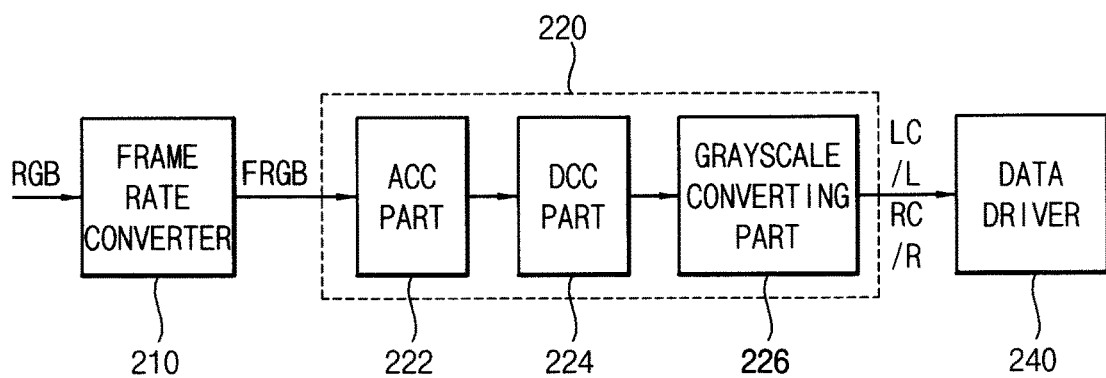
FIG. 5 is a block diagram illustrating an exemplary embodiment of a timing controller of FIG. 1.

The frame rate converter 210 converts a frame rate of the input image data RGB to generate first image data FRGB (shown in FIG. 5). The first image data FRGB may have a frame rate twice the frame rate of the input image data RGB. In one exemplary embodiment, for example, the input image data RGB has the frame rate of about 120 hertz (Hz), and the first image data FRGB has the frame rate of about 240 Hz.

In an exemplary embodiment, when the input image data RGB includes a left image and a right image, the first image data FRGB includes two left images and two right images.

The frame rate converter 210 may copy the left image and the right image. In an exemplary embodiment, the frame rate converter 210 may operate a motion compensation of the left and right images.

The frame rate converter 210 outputs the first image data FRGB to the timing controller 220.

In an exemplary embodiment, the timing controller 220 receives an input control signal from outside. In an alternative exemplary embodiment, the timing controller 220 may receive the input control signal from the frame rate converter 210. The input control signal may include a master clock signal, a data enable signal, a vertical synchronizing signal and a horizontal synchronizing signal, for example.

The timing controller 220 generates a first control signal for controlling a driving timing of the gate driver 230, a second control signal for controlling a driving timing of the data driver 240 and a third control signal for controlling a driving timing of the light source driver 400.

The timing controller 220 outputs the first control signal to the gate driver 230. The timing controller 220 outputs the second control signal to the data driver 240. The timing controller 220 outputs the third control signal to the light source driver 400.

The first control signal may include a vertical start signal and a gate clock signal. The second control signal may include a horizontal start signal, a load signal and a polarity inverting signal.

The timing controller 220 receives the first image data FRGB from the frame rate converter 210. The timing controller 220 converts the first image data FRGB to generate converted image data. The timing controller 220 outputs the converted image data to the data driver 240.

In an exemplary embodiment, the timing controller 220 may control an operation of the light converting glasses 500 based on an image displayed on the display panel 100.

An image processing of the timing controller 220 will be described later in detail referring to FIG. 5.

The gate driver 230 receives the first control signal from the timing controller 220. The gate driver 230 generates a gate signal for driving the gate line GL in response to the first control signal. The gate driver 230 outputs the gate signal to the gate line GL.

The data driver 240 receives the second control signal and the converted image data from the timing controller 220. The data driver 240 converts the converted image data into a data voltage in an analog form in response to the second control signal. The data driver 240 outputs the data voltage to the data line DL.

An image processing of the data driver 240 will be described later in detail referring to FIG. 6.

The light source part 300 provides light to the display panel 100. The light source part 300 may be a backlight assembly disposed under the display panel 100.

In an exemplary embodiment, the light source part 300 may be a direct type backlight assembly including a plurality of light sources disposed under the display panel 100.

In an alternative exemplary embodiment, the light source part 300 may be an edge type backlight assembly including a plurality of light sources corresponding to an edge portion of the display panel 100 and a light guide plate.

The light source part 300 may be divided into a plurality of light emitting blocks. In one exemplary embodiment, for example, the light source part 300 may be divided into eight light emitting blocks. Each of the light emitting blocks may include one or more light sources. Longer sides of the light emitting blocks may extend in the direction substantially parallel to the gate line GL. Shorter sides of the light emitting blocks may extend in the direction substantially parallel to the data line DL. The light emitting blocks adjacent to each other may be disposed in the direction substantially parallel to the data line DL.

In an exemplary embodiment, the light source part 300 is divided into eight light emitting blocks, but the invention is not limited thereto.

The light emitting blocks may sequentially provide light to the display blocks along a scanning direction of the display blocks. The scanning direction of the display blocks may be substantially parallel to the data line DL. The light emitting blocks may correspond to the display blocks, respectively. In one exemplary embodiment, for example, a first light emitting block provides the light to a first display block. A second light emitting block provides the light to a second display block.

In an exemplary embodiment, the light source part 300 is divided into a plurality of light emitting blocks, but the invention is not limited thereto. In an exemplary embodiment, the light source part 300 may be driven in a blinking type, in which all of the light sources of the light source part 300 are simultaneously turned on and off. In another alternative exemplary embodiment, the light source part 300 may be continuously turned on.

The light source driver 400 receives the third control signal from the timing controller 220. The light source driver 400 drives the light source part 300 in response to the third control signal. The light source driver 400 may be connected to the panel driver 200.

In an exemplary embodiment, the light source driver 400 may control the light source part 300 such that the light emitting blocks are sequentially turned on along the scanning direction of the display blocks. Turned-on durations of the adjacent light emitting blocks may overlap each other.

The light converting glasses 500 includes a left glass 510 and a right glass 520. In an exemplary embodiment, the light converting glasses 500 may be shutter glasses which selectively open and close the left glass 510 and the right glass 520 to convert a two-dimensional ("2D") image into a three-dimensional ("3D") image.

The light converting glasses 500 may selectively open and close the left glass 510 and the right glass 520 in response to a shutter control signal received from the timing control signal 220.

The light converting glasses 500 functions as a light converting element, which selectively or totally blocks light, to convert the 2D image into the 3D image.

In an exemplary embodiment, a retarder (not shown) unit may be disposed on the display panel 100 as the light converting element. The retarder unit may include one of a patterned retarder and an active retarder. The retarder unit may selectively transmit polarized light of the image displayed in the pixel. In an exemplary embodiment, the polarized light may be selectively transmitted by a second light converting element. In such an embodiment, the second light converting element may be polarizing glasses.

In an exemplary embodiment, the retarder unit may polarize a left image or a right image by the timing controller, the left glass 510 may transmit the polarized left image, and the right glass 520 may transmit the polarized right image. The retarder unit may be an active retarder unit which changes a polarizing characteristic according to a frame of the image displayed on the display panel 100.

Figure 2:
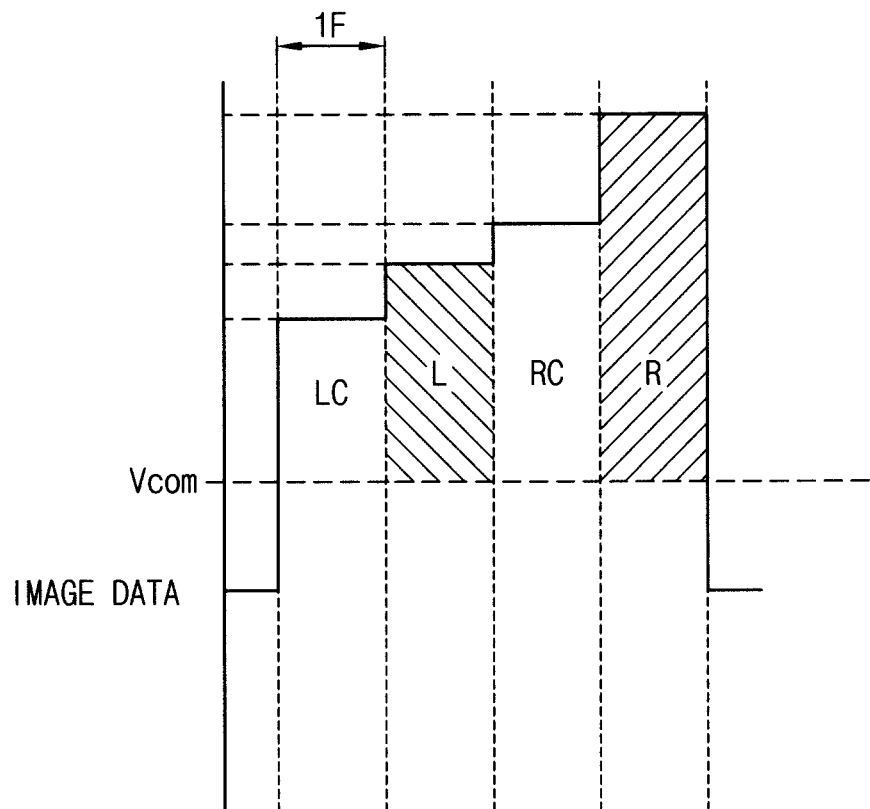
FIG. 2 is a timing diagram illustrating an exemplary embodiment of image data applied to a display panel of FIG. 1.
Figure 3:
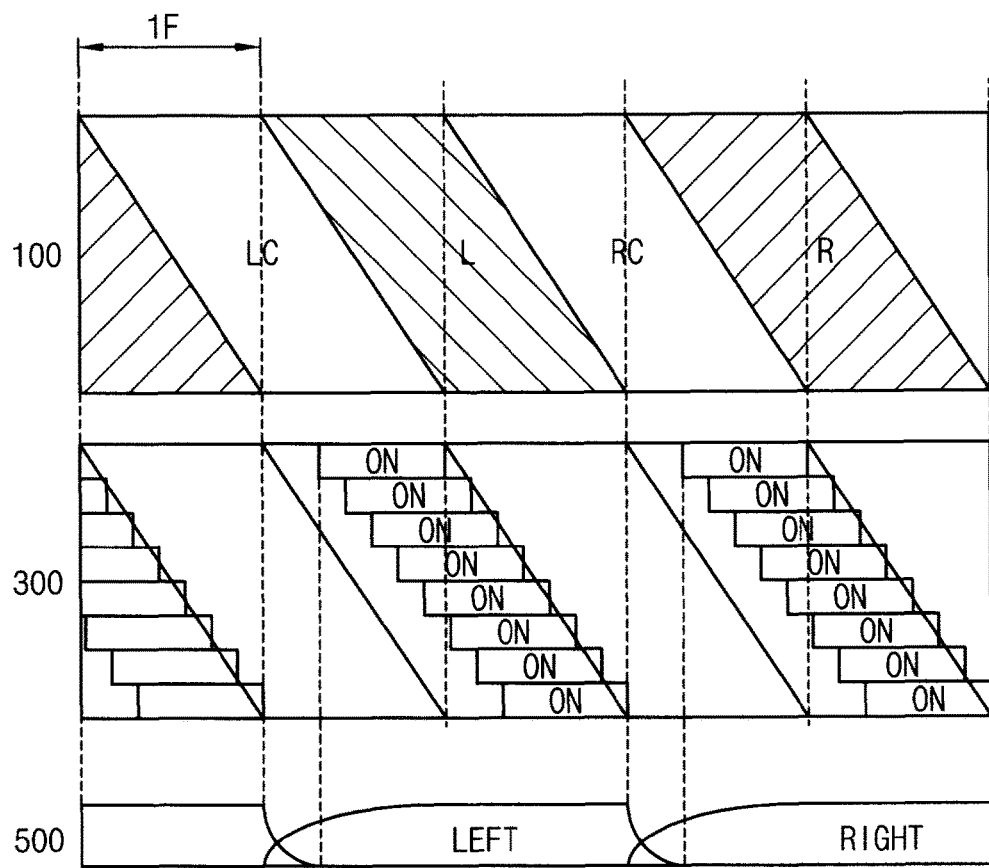
FIG. 3 is a conceptual diagram for explaining an exemplary embodiment of a method of displaying a three-dimensional ("3D") image using the display apparatus of FIG. 1.
Figure 4:
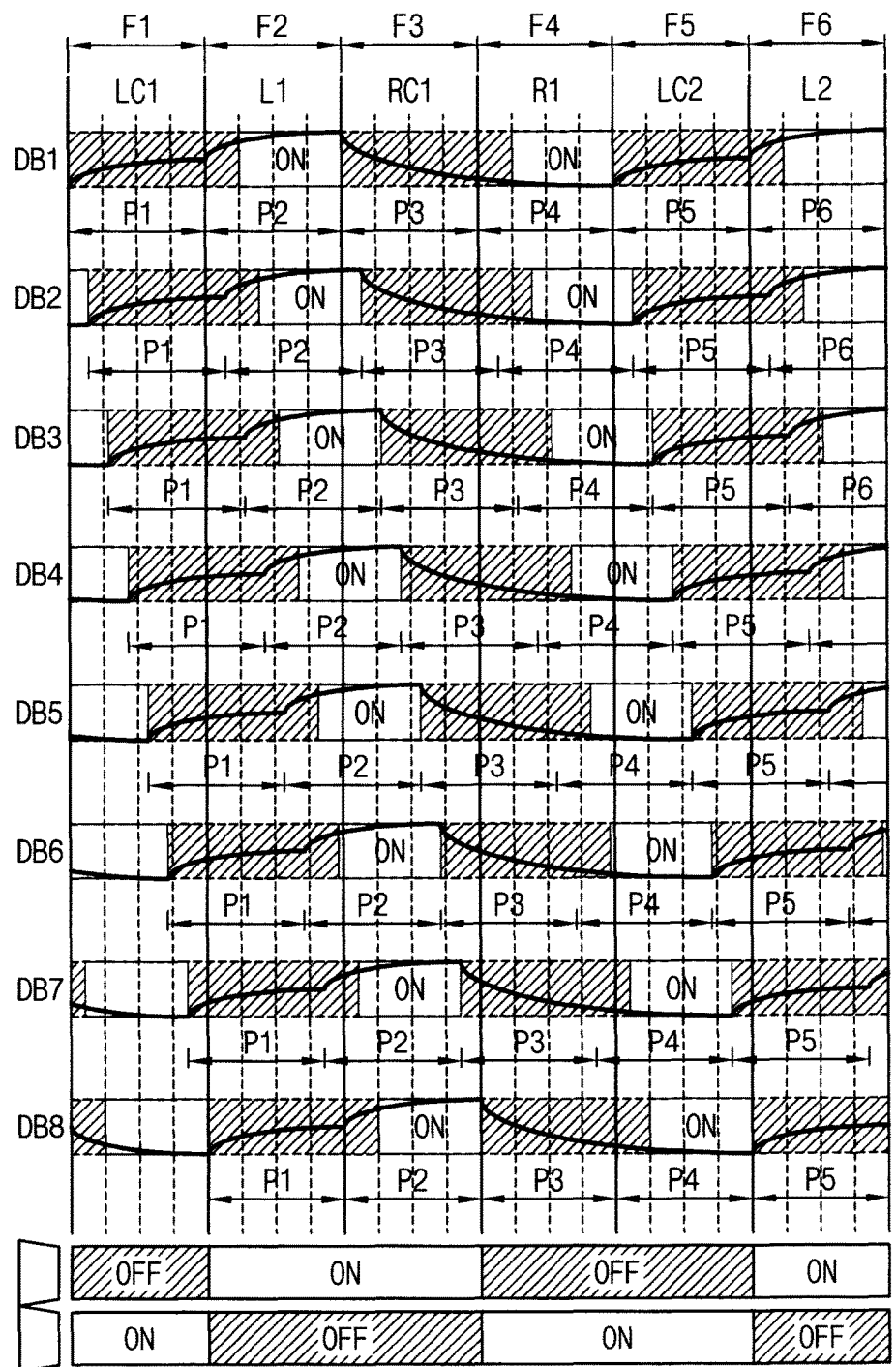
FIG. 4 is a signal timing diagram for explaining an exemplary embodiment of a method of displaying the 3D image using the display apparatus of FIG. 1.

FIG. 2 is a timing diagram illustrating an exemplary embodiment of image data applied to the display panel 100 of FIG. 1. FIG. 3 is a conceptual diagram for explaining an exemplary embodiment of a method of displaying the 3D image using the display apparatus of FIG. 1. FIG. 4 is a signal timing diagram for explaining an exemplary embodiment of a method of displaying the 3D image using the display apparatus of FIG. 1.

Referring to FIGS. 1 to 4, the display panel 100, the light source part 300 and the light converting glasses 500 may be synchronized with one another.

In an exemplary embodiment of the method of displaying the 3D image, a left image L and a right image R are applied to a pixel of the display panel 100 during a normal data application period. Converted images LC and RC are applied to the pixel of the display panel 100 during a converted data application period, which is prior to the normal data application period. The converted images LC and RC have grayscale values less than grayscale values of the left and right images L and R.

As shown in FIG. 2, the display panel 100 sequentially displays the converted left image LC, the left image L, the converted right image RC and the right image R. In FIG. 2, Vcom denotes a common voltage, which is applied to a common electrode of the display panel. The converted left image LC is generated based on the left image L. The converted left image LC has a grayscale value less than a grayscale value of the left image L. The left image L has a grayscale value corresponding to an image to be viewed at a left eye of a viewer. The converted right image RC is generated based on the right image R. The converted right image RC has a grayscale value less than a grayscale value of the right image R. The right image R has a grayscale value corresponding to an image to be viewed at a right eye of the viewer. Each of the converted left image LC, the left image L, the converted right image RC and the right image R is displayed on the pixel of the display panel 100 corresponding to a frame 1F.

In an exemplary embodiment, the light source part 300 includes the light emitting blocks. The light emitting blocks are sequentially turned on along the scanning direction of the display panel 100. The light emitting blocks sequentially provide light to the display blocks of the display panel 100. In one exemplary embodiment, for example, the display panel 100 includes eight display blocks, e.g., a first to eight display blocks DB1 to DB8, and the light source part 300 includes eight light emitting blocks, but not being limited thereto.

Open and close times of the light converting glasses 500 are adjusted corresponding to the left image L and the right image R.

FIG. 4 shows an image voltage of a pixel in each of the display blocks DB1 to DB8 based on a response time of a liquid crystal layer. In FIG. 4, first and second left images L1 and L2 have relatively high grayscale values, and the right image R1 has a relatively low grayscale value.

During a first frame F1, voltages corresponding to a first converted left image LC1 are sequentially applied to the first to eight display blocks DB1 to DB8 along the scanning direction. The first converted left image LC1 is generated based on the first left image L1 to have a grayscale value less than a grayscale value of the first left image L1.

During a second frame F2, voltages corresponding to the first left image L1 are sequentially applied to the first to eight display blocks DB1 to DB8 along the scanning direction.

During a third frame F3, voltages corresponding to a first converted right image RC1 are sequentially applied to the first to eight display blocks DB1 to DB8 along the scanning direction. The first converted right image RC1 is generated based on the first right image R1 to have a grayscale value less than a grayscale value of the first right image R1.

During a fourth frame F4, voltages corresponding to the first right image R1 are sequentially applied to the first to eight display blocks DB1 to DB8 along the scanning direction.

During a fifth frame F5, voltages corresponding to a second converted left image LC2 are sequentially applied to the first to eight display blocks DB1 to DB8 along the scanning direction. The second converted left image LC2 is generated based on the second left image L2 to have a grayscale value less than a grayscale value of the second left image L2.

During a sixth frame F6, voltages corresponding to the second left image L2 are sequentially applied to the first to eight display blocks DB1 to DB8 along the scanning direction.

In a first pixel in the first display block DB1, during a first period P1, a voltage corresponding to the first converted left image LC1 is applied to the first pixel such that the first pixel displays the first converted left image LC1. During a second period P2, a voltage corresponding to the first left image L1 is applied to the first pixel such that the first pixel displays the first left image L1. During a third period P3, a voltage corresponding to the first converted right image RC1 is applied to the first pixel such that the first pixel displays the first converted right image RC1. During a fourth period P4, a voltage corresponding to the first right image R1 is applied to the first pixel such that the first pixel displays the first right image R1. During a fifth period P5, a voltage corresponding to the second converted left image LC2 is applied to the first pixel such that the first pixel displays the second converted left image LC2. During a sixth period P6, a voltage corresponding to the second left image L2 is applied to the first pixel such that the first pixel displays the second left image L2.

The second display block DB2 has a driving timing delayed with respect to a driving timing of the first display block DB1. In a second pixel in the second display block DB2, during a first period P1, a voltage corresponding to the first converted left image LC1 is applied to the second pixel such that the second pixel displays the first converted left image LC1. During a second period P2, a voltage corresponding to the first left image L1 is applied to the second pixel such that the second pixel displays the first left image L1. During a third period P3, a voltage corresponding to the first converted right image RC1 is applied to the second pixel such that the second pixel displays the first converted right image RC1. During a fourth period P4, a voltage corresponding to the first right image R1 is applied to the second pixel such that the second pixel displays the first right image R1. During a fifth period P5, a voltage corresponding to the second converted left image LC2 is applied to the second pixel such that the second pixel displays the second converted left image LC2. During a sixth period P6, a voltage corresponding to the second left image L2 is applied to the second pixel such that the second pixel displays the second left image L2.

In a similar way as described above, the third to eighth display blocks DB3 to DB8 are sequentially driven.

The light source part 300 provides light to the first to eighth display blocks DB1 to DB8 synchronized with the scanning driving of the first to eighth display blocks DB1 to DB8.

The light source part 300 temporally provides light to the pixels in the second period P2 and the fourth period P4. The light source part 300 temporally provides light to the pixels when the pixels display the left and right images L and R to be viewed at the left and right eyes of the viewer.

Open and close times of the light converting glasses 500 are adjusted corresponding to the left image L and the right image R. The left glass 510 is turned off during the first frame F1, the fourth frame F4 and the fifth frame F5. The left glass 510 is turned on during the second frame F2, the third frame F3 and the sixth frame F6. The right glass 520 is turned on during the first frame F1, the fourth frame F4 and the fifth frame F5. The right glass 520 is turned off during the second frame F2, the third frame F3 and the sixth frame F6.

During the first period P1, the first converted left image LC1 is applied to the pixel prior to applying the first left image L1, which is the image to be viewed at the left eye of the viewer, such that the first converted left image LC1 pretilts the liquid crystal layer corresponding to the pixel. Thus, during the second period P2, the pixel may rapidly display the first left image L1 to be viewed at the left eye of the viewer such that a luminance of the display panel 100 increases.

During the third period P3, the first converted right image RC1 having a grayscale value less than the grayscale value of the first right image R1, which is the image to be viewed at right left eye of the viewer, is applied to the pixel. Thus, during the fourth period P4, the pixel may rapidly display the first right image R1 to be viewed at the right eye of the viewer such that a crosstalk of the 3D image is effectively prevented.

During the fifth period P5, the second converted left image LC2 having a grayscale value less than a grayscale value of the second left image L2, which is an image to be viewed at the left eye of the viewer, is applied to the pixel. Thus, a crosstalk of the 3D image due to leakage light between the light emitting blocks is effectively prevented.

FIG. 5 is a block diagram illustrating an exemplary embodiment of the timing controller 220 of FIG. 1.

Referring to FIGS. 1 to 5, the timing controller 220 may include an adaptive color correction ("ACC") part 222, a dynamic capacitance compensation ("DCC") part 224 and a grayscale converting part 226.

The ACC part 222 operates adaptive color correction to the first image data FRGB. The ACC part 222 compensates the first image data FRGB using a gamma curve.

The DCC part 224 operates dynamic capacitance compensation, which compensates a grayscale data of a current frame data using a previous frame data and the current frame data. In an exemplary embodiment, the first image data FRGB includes two duplicated left images and two duplicated right images such that the DCC part 224 may operate the dynamic capacitance compensation in each two frames.

In one exemplary embodiment, a grayscale value of the left image L may be generated by comparing an input left image of the current frame to an input right image or an input left image of the previous frame. A grayscale value of the right image R may be generated by comparing an input right image of the current frame to an input left image or an input right image of the previous frame. In an exemplary embodiment, when the first converted left image LC1, the first left image L1, the first converted right image RC1 and the first right image R1, are sequentially displayed on the pixel of the display panel, and then the second converted left image LC2, the second left image L2, the second converted right image RC2 and the second right image R2 are sequentially displayed on the pixel of the display panel, the grayscale value of the second left image L2 may be generated by comparing a grayscale value of a second input left image corresponding to the second left image L2 to a grayscale value of a first input right image corresponding to the first right image R1. In such an embodiment, the grayscale value of the second right image R2 may be generated by comparing a grayscale value of a second input right image corresponding to the second right image R2 to a grayscale value of a second input left image corresponding to the second left image L2.

In an exemplary embodiment, a position of the ACC part 222 and the DCC part 224 may be switched to each other. Accordingly, in such an embodiment, an operation sequence of the ACC and the DCC may be switched to each other.

The grayscale converting part 226 generates the converted left image LC having a grayscale value less than the grayscale value of the left image L based on the left image L. The grayscale converting part 226 generates the converted right image RC having a grayscale value less than the grayscale value of the right image R based on the right image R. In an exemplary embodiment, when the left image L and the right image R have zero grayscale value, the converted left image LC and the converted right image RC may have grayscale values substantially the same as the grayscale values of the left image L and the right image R. In such an embodiment, when the left image L and the right image R have the grayscale values substantially the same as each other, the converted left image LC and the converted right image RC may have the grayscale values substantially the same as each other.

In an exemplary embodiment of the invention, the grayscale converting part 226 may generate the converted left and right images LC and RC by multiplying the grayscale values of the left and right images L and R by a converting value. In such an embodiment, the converting value is less than one. In one exemplary embodiment, for example, the left image L has the grayscale value of 256 and the converting value is 0.75 such that the converted left image LC may have the grayscale value of 192.

In an exemplary embodiment, the grayscale converting part 226 may include a multiplexer circuit to multiply the grayscale values of the left and right images L and R by the converting value.

In an exemplary embodiment, the converting value may be determined based on the grayscale values of the left and right images L and R. In an exemplary embodiment, the converting value may be controlled by a user.

In an exemplary embodiment of the invention, the grayscale converting part 226 may generate the converted left and right images LC and RC using a lookup table including the grayscale values corresponding to the grayscale values of the left and right images L and R. In an exemplary embodiment, the timing controller 200 may further include a memory (not shown) that stores the lookup table.

The grayscale converting part 226 outputs the converted left image LC, the left image L, the converted right image RC and the right image R to the data driver 240.

Figure 6:
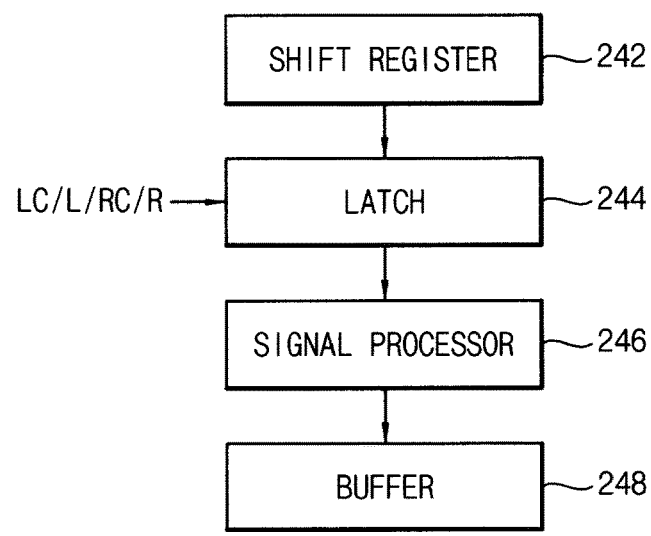
FIG. 6 is a block diagram illustrating an exemplary embodiment of a data driver of FIG. 1.

FIG. 6 is a block diagram illustrating an exemplary embodiment of the data driver 240 of FIG. 1.

Referring to FIG. 6, the data driver 240 includes a shift register 242, a latch 244, a signal processor 246 and a buffer 248. The shift register 242 outputs a latch pulse to the latch 244. The latch 244 temporally stores the converted left image LC, the left image L, the converted right image RC and the right image R, and outputs the converted left image LC, the left image L, the converted right image RC and the right image R to the signal processor 246. The signal processor 246 converts the converted left image LC, the left image L, the converted right image RC and the right image R in a digital form to data voltages in an analog form based on the gamma reference voltages, and outputs the data voltages to the buffer 248. The buffer 248 compensates the data voltages to have uniform levels, and outputs the data voltages to the data lines DL.

According to an exemplary embodiment, a luminance of the display panel 100 substantially increases, and a crosstalk of the 3D image is effectively prevented such that display quality of the 3D image is improved.

Figure 7:
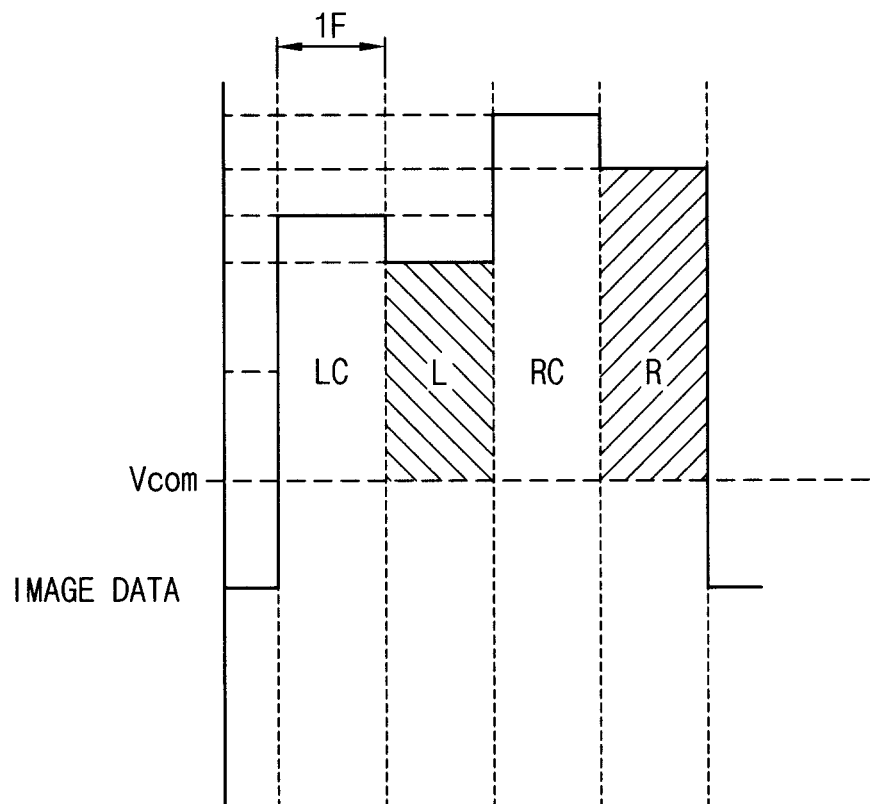
FIG. 7 is a timing diagram illustrating image data applied to a display panel of an alternative exemplary embodiment of a display apparatus according to the invention.
Figure 8:
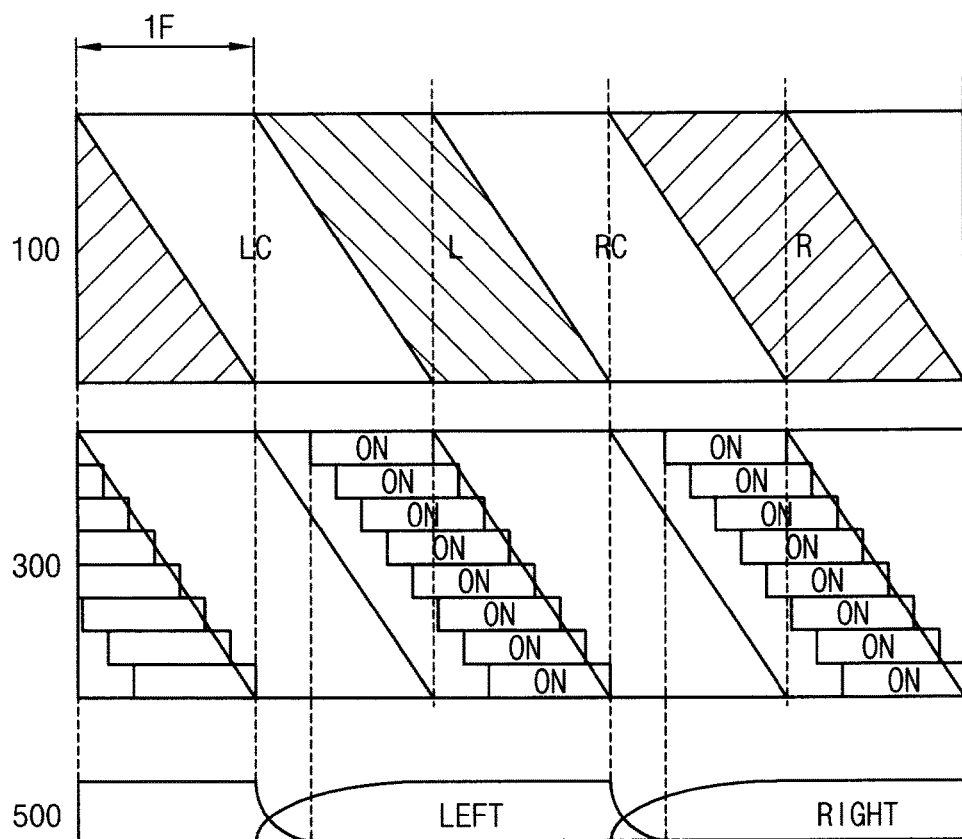
FIG. 8 is a conceptual diagram for explaining an exemplary embodiment of a method of displaying a 3D image using the display apparatus of FIG. 7.
Figure 9:
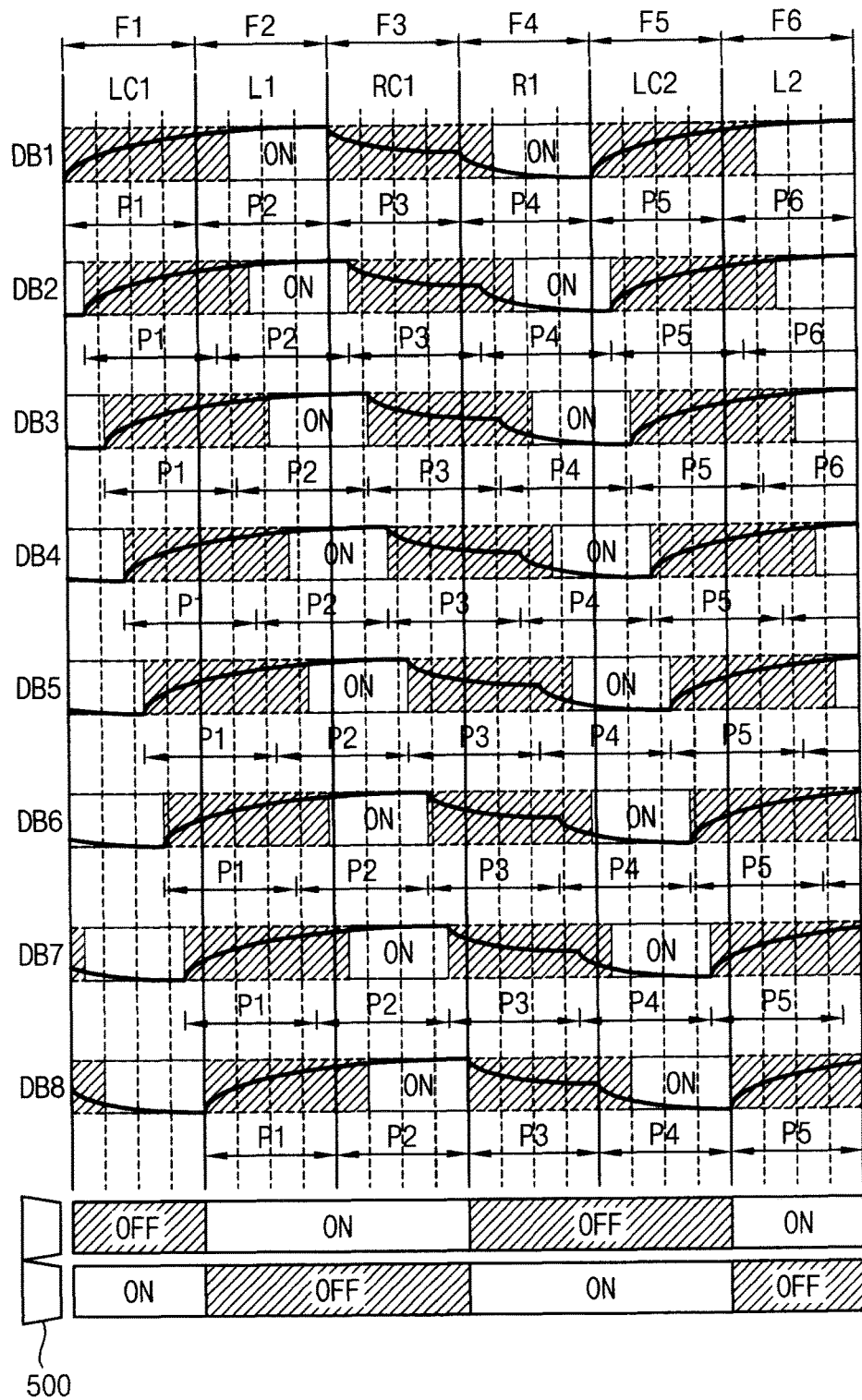
FIG. 9 is a signal timing diagram for explaining an alternative exemplary embodiment of a method of displaying the 3D image using the display apparatus of FIG. 7.

FIG. 7 is a timing diagram illustrating image data applied to a display panel of an alternative exemplary embodiment of a display apparatus according to the invention. FIG. 8 is a conceptual diagram for explaining an exemplary embodiment of a method of displaying a 3D image using the display apparatus of FIG. 7. FIG. 9 is a signal timing diagram for explaining an exemplary embodiment of a method of displaying the 3D image using the display apparatus of FIG. 7.

A display apparatus and a method of displaying the 3D image of FIG. 9 is substantially the same as the display apparatus and the method of displaying the 3D image of FIGS. 1 to 6 except for the converted left image LC and the converted right image RC. Thus, the same reference characters will be used to refer to the same or like elements as those described in the exemplary embodiment of FIGS. 1 to 6, and any repetitive detailed description thereof will be omitted or simplified.

Referring to FIGS. 1, 7 and 9, the display apparatus includes a display panel 100, a panel driver 200, a light source part 300, a light source driver 400 and light converting glasses 500.

The display panel 100, the light source part 300 and the light converting glasses 500 may be synchronized with one another.

In an exemplary embodiment of the method of displaying the 3D image, a left image L and a right image R are applied to a pixel of the display panel 100 during a normal data application period. Converted images LC and RC are applied to the pixel of the display panel 100 during a converted data application period, which is prior to the normal data application period. The converted images LC and RC have grayscale values greater than grayscale values of the left and right images L and R.

In such an embodiment, as shown in FIG. 7, the display panel 100 sequentially displays the converted left image LC, the left image L, the converted right image RC and the right image R. In FIG. 7, Vcom denotes a common voltage, which is applied to a common electrode of the display panel. The converted left image LC is generated based on the left image L. The converted left image LC has a grayscale value greater than a grayscale value of the left image L. The left image L has a grayscale value corresponding to the image to be viewed at a left eye of a viewer. The converted right image RC is generated based on the right image R. The converted right image RC has a grayscale value greater than a grayscale value of the right image R. The right image R has a grayscale corresponding to the image to be viewed at a right eye of the viewer.

Each of the converted left image LC, the left image L, the converted right image RC and the right image R is displayed on the pixel of the display panel 100 corresponding to a frame 1F.

The light source part 300 includes the light emitting blocks. The light emitting blocks are sequentially turned on along the scanning direction of the display panel 100. The light emitting blocks sequentially provide light to the display blocks of the display panel 100. In an exemplary embodiment, the display panel 100 includes eight display blocks, e.g., the first to eighth display blocks DB1 to DB8, and the light source part 300 includes eight light emitting blocks.

Open and close times of the light converting glasses 500 are adjusted corresponding to the left image L and the right image R.

In a first pixel in the first display block DB1, during a first period P1, a voltage corresponding to the first converted left image LC1 is applied to the first pixel such that the first pixel displays the first converted left image LC1. During a second period P2, a voltage corresponding to the first left image L1 is applied to the first pixel such that the first pixel displays the first left image L1. During a third period P3, a voltage corresponding to the first converted right image RC1 is applied to the first pixel such that the first pixel displays the first converted right image RC1. During a fourth period P4, a voltage corresponding to the first right image R1 is applied to the first pixel such that the first pixel displays the first right image R1. During a fifth period P5, a voltage corresponding to the second converted left image LC2 is applied to the first pixel such that the first pixel displays the second converted left image LC2. During a sixth period P6, a voltage corresponding to the second left image L2 is applied to the first pixel such that the first pixel displays the second left image L2.

The second display block DB2 has a driving timing delayed with respect to a driving timing of the first display block DB1. In a similar way as described above, the third to eighth display blocks DB3 to DB8 are sequentially driven.

During the first period P1, the first converted left image LC1 is applied to the pixel prior to applying the first left image L1 which is the image to be viewed at the left eye of the viewer such that the pixel is driven in an overshoot driving method. Thus, during the second period P2, the pixel may rapidly display the first left image L1 to be viewed at the left eye of the viewer. Therefore, in such an embodiment, a luminance of the display panel 100 increases.

The grayscale converting part 226 of the timing controller 220 generates the converted left image LC having a grayscale value greater than the grayscale value of the left image L based on the left image L. The grayscale converting part 226 generates the converted right image RC having a grayscale value greater than the grayscale value of the right image R based on the right image R.

In an exemplary embodiment of the invention, the grayscale converting part 226 may generate the converted left and right images LC and RC by multiplying the grayscale values of the left and right images L and R by a converting value. In such an embodiment, the converting value is greater than one.

The converting value may be determined based on the grayscale values of the left and right images L and R. The converting value may be varied by a user.

In an exemplary embodiment of the invention, the grayscale converting part 226 may generate the converted left and right images LC and RC using a lookup table including the grayscale values corresponding to the grayscale values of the left and right images L and R.

According to an exemplary embodiment, a response time of the liquid crystal layer increases such that a luminance of the display panel 100 increases and luminance uniformity is improved. Thus, in such an embodiment, display quality of the 3D image is improved.

Figure 10:
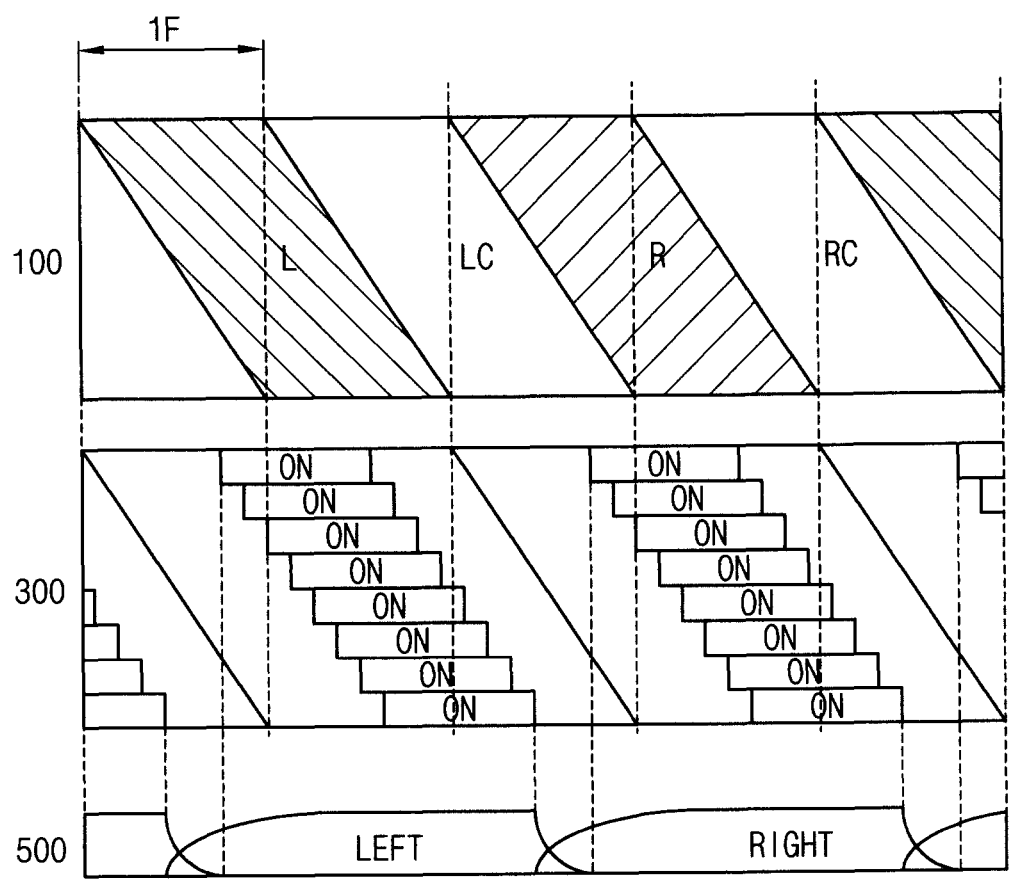
FIG. 10 is a conceptual diagram for explaining an exemplary embodiment of a method of displaying a 3D image using an alternative exemplary embodiment of a display apparatus.
Figure 11:
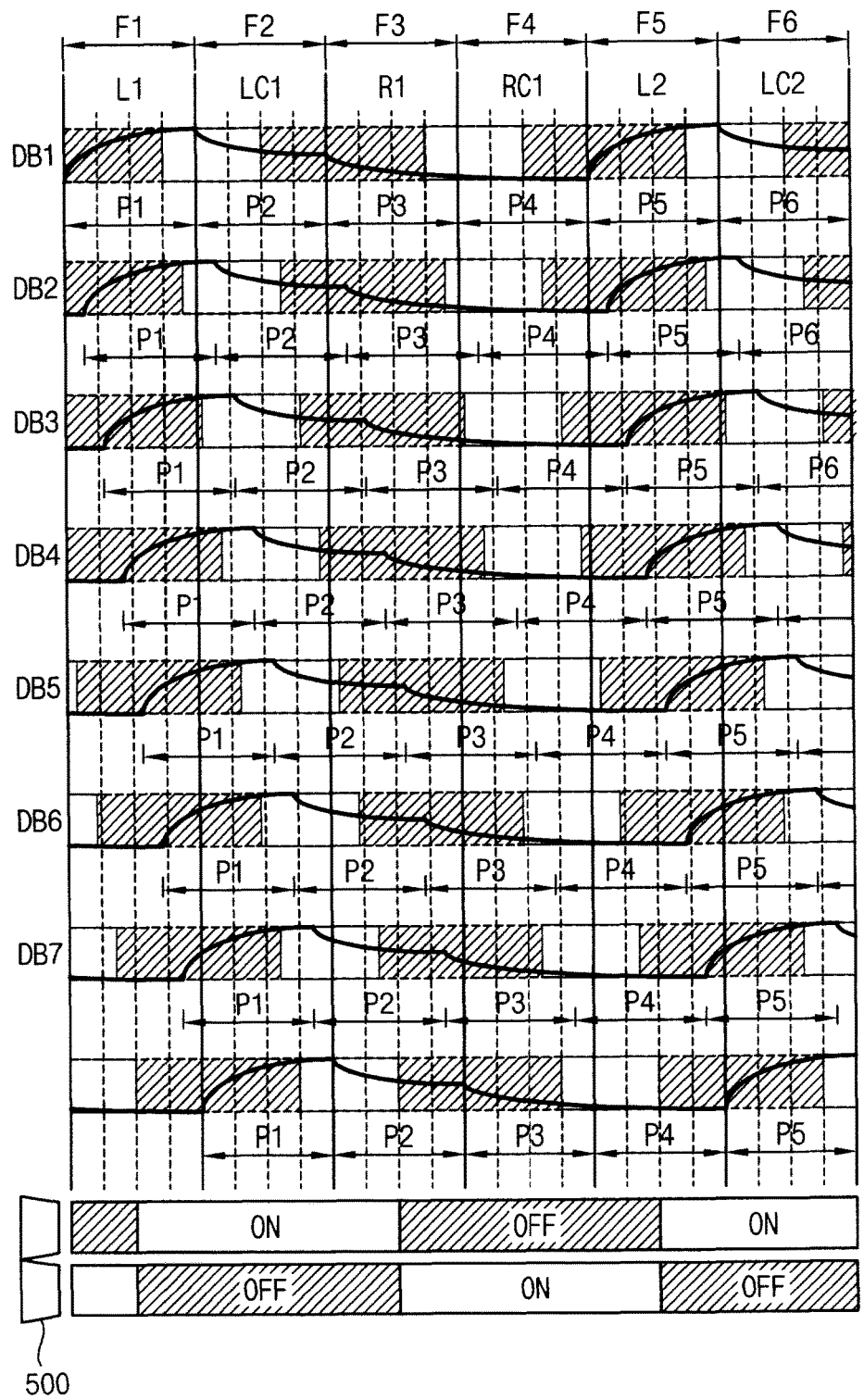
FIG. 11 is a signal timing diagram for explaining an exemplary embodiment of a method of displaying the 3D image using the display apparatus of FIG. 10.

FIG. 10 is a conceptual diagram for explaining an exemplary embodiment of a method of displaying a 3D image using another alternative exemplary embodiment of a display apparatus. FIG. 11 is a signal timing diagram for explaining an exemplary embodiment of a method of displaying the 3D image using the display apparatus of FIG. 10.

A display apparatus and a method of displaying the 3D image of FIGS. 10 and 11 is substantially the same as the display apparatus and the method of displaying the 3D image shown in FIGS. 1 to 6 except for a sequence of displaying the images LC, L, RC and R. Thus, the same reference characters will be used to refer to the same or like elements as those described in the exemplary embodiment of FIGS. 1 to 6, and any repetitive detailed description thereof will be omitted or simplified.

Referring to FIGS. 1, 10 and 11, the display apparatus includes a display panel 100, a panel driver 200, a light source part 300, a light source driver 400 and light converting glasses 500.

The display panel 100, the light source part 300 and the light converting glasses 500 may be synchronized with one another.

The display panel 100 sequentially displays the left image L, the converted left image LC, the right image R and the converted right image RC. The converted left image LC is generated based on the left image L. The converted left image LC has a grayscale value less than a grayscale value of the left image L. The left image L has a grayscale corresponding to an image to be viewed at a left eye of a viewer. The converted right image RC is generated based on the right image R. The converted right image RC has a grayscale value less than a grayscale value of the right image R. The right image R has a grayscale value corresponding to an image to be viewed at a right eye of the viewer.

Each of the left image L, the converted left image LC, the right image R and the converted right image RC is displayed on the pixel of the display panel 100 corresponding to a frame 1F.

The light source part 300 includes the light emitting blocks. The light emitting blocks are sequentially turned on along the scanning direction of the display panel 100. The light emitting blocks sequentially provide light to the display blocks of the display panel 100. In an exemplary embodiment, the display panel 100 includes eight display blocks, e.g., the first to eight display blocks DB1 to DB8, and the light source part 300 includes eight light emitting blocks.

Open and close times of the light converting glasses 500 are adjusted corresponding to the left image L and the right image R.

In a first pixel in the first display block DB1, during a first period P1, a voltage corresponding to the first left image L1 is applied to the first pixel such that the first pixel displays the first left image L1. During a second period P2, a voltage corresponding to the first converted left image LC1 is applied to the first pixel such that the first pixel displays the first converted left image LC1. During a third period P3, a voltage corresponding to the first right image R1 is applied to the first pixel such that the first pixel displays the first right image R1. During a fourth period P4, a voltage corresponding to the first converted right image RC1 is applied to the first pixel such that the first pixel displays the first converted right image RC1. During a fifth period P5, a voltage corresponding to the second left image L2 is applied to the first pixel such that the first pixel displays the second left image L2. During a sixth period P6, a voltage corresponding to the second converted left image LC2 is applied to the first pixel such that the first pixel displays the second converted left image LC2.

The second display block DB2 has a driving timing delayed with respect to a driving timing of the first display block DB1. In a similar way as described above, the third to eighth display blocks DB3 to DB8 are sequentially driven.

The light source part 300 temporally provides light to the pixels in an ending portion of the first period P1 and a beginning portion of the second period P2. The light source part 300 temporally provides light to the pixels in an ending portion of the third period P3 and a beginning portion of the fourth period P4.

In an exemplary embodiment, during the second period P2, the first converted left image LC1 having the grayscale value less than the grayscales value of the first left image L1 is displayed such that a crosstalk decreases. In such an embodiment, a luminance of the display panel 100 increases when compared to a conventional display panel that displays a black image during the second period P2.

According to an exemplary embodiment, a crosstalk of the 3D image decreases and a luminance of the display panel 100 increases such that display quality of the 3D image is improved.

Figure 12:
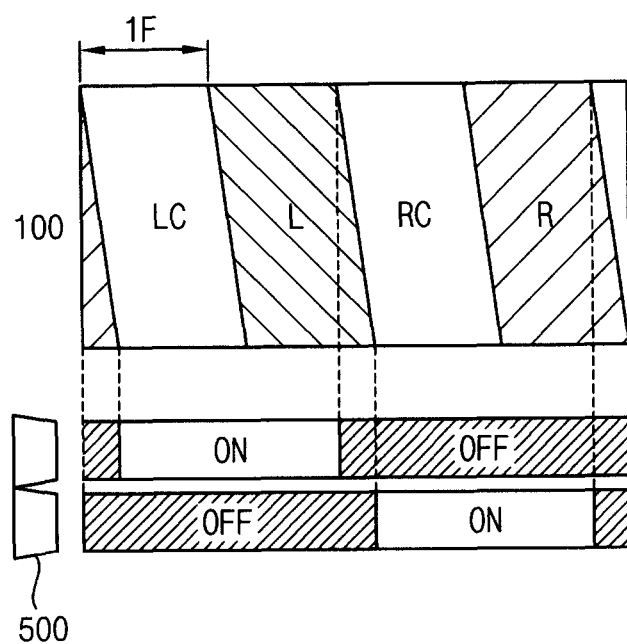
FIG. 12 is a signal timing for explaining an exemplary embodiment of a method of displaying a 3D image using another alternative exemplary embodiment of a display apparatus.

FIG. 12 is a conceptual diagram for explaining an exemplary embodiment of a method of displaying a 3D image using another alternative exemplary embodiment of a display apparatus.

A display apparatus and a method of displaying the 3D image of FIG. 12 is substantially the same as the display apparatus and the method of displaying the 3D image shown in FIGS. 1 to 6 except that the light source part 300 is continuously turned on. Thus, the same reference characters will be used to refer to the same or like elements as those described in the exemplary embodiment of FIGS. 1 to 6, and any repetitive detailed description thereof will be omitted or simplified.

Referring to FIGS. 1 and 12, the display apparatus includes a display panel 100, a panel driver 200, a light source part 300, a light source driver 400 and light converting glasses 500.

The display panel 100 and the light converting glasses 500 may be synchronized with each other.

The display panel 100 sequentially displays the converted left image LC, the left image L, the converted right image RC and the right image R. The converted left image LC is generated based on the left image L. The converted left image LC has a grayscale value less than a grayscale value of the left image L. The left image L has a grayscale value corresponding to an image to be viewed at a left eye of a viewer. The converted right image RC is generated based on the right image R. The converted right image RC has a grayscale value less than a grayscale value of the right image R. The right image R has a grayscale value corresponding to an image to be viewed at a right eye of the viewer. Each of the converted left image LC, the left image L, the converted right image RC and the right image R is displayed on the pixel of the display panel 100 corresponding to a frame 1F.

The light source part 300 continuously provides light to the display panel 100.

Open and close times of the light converting glasses 500 are adjusted corresponding to the left image L and the right image R. Both of a left glass 510 and a right glass 520 of the light converting glasses 500 may be turned off corresponding to a scanning time of the display panel 100. The close time of the left glass 510 partially overlap the close time of the right glass 520.

According to an exemplary embodiment, a luminance of the display panel 100 increases, and a crosstalk of the 3D image is effectively prevented such that display quality of the 3D image is improved.

Figure 13:
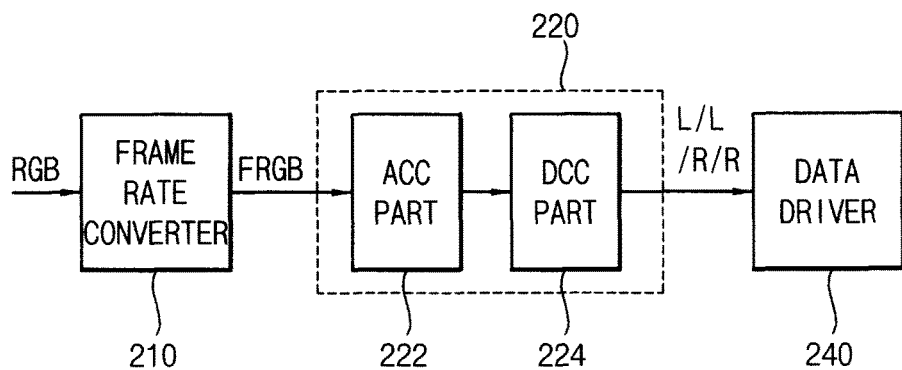
FIG. 13 is a block diagram illustrating an exemplary embodiment of a timing controller of a display apparatus.
Figure 14:
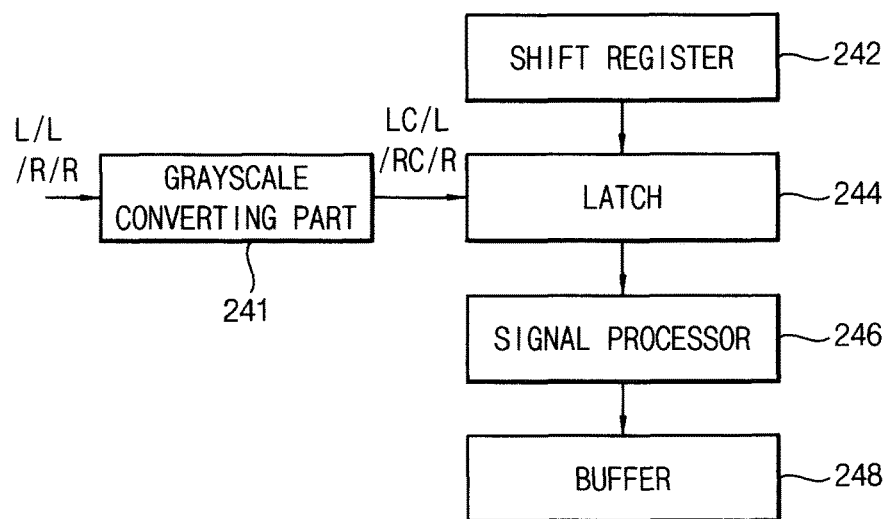
FIG. 14 is a block diagram illustrating an exemplary embodiment of a data driver of the display apparatus of FIG. 13.

FIG. 13 is a block diagram illustrating a timing controller of an alternative exemplary embodiment of a display apparatus. FIG. 14 is a block diagram illustrating an exemplary embodiment of a data driver of the display apparatus of FIG. 13.

A display apparatus and a method of displaying the 3D image of FIGS. 13 and 14 is substantially the same as the display apparatus and the method of displaying the 3D image of the exemplary embodiment shown in FIGS. 1 to 6 except that the data driver 240 generates the converted left and right images LC and RC. Thus, the same reference characters will be used to refer to the same or like elements as those described in the exemplary embodiment of FIGS. 1 to 6, and any repetitive detailed description thereof will be omitted or simplified.

Referring to FIGS. 1, 13 and 14, the display apparatus includes a display panel 100, a panel driver 200, a light source part 300, a light source driver 400 and light converting glasses 500.

The display panel 100, the light source part 300 and the light converting glasses 500 may be synchronized with one another.

The display panel 100 sequentially displays the converted left image LC, the left image L, the converted right image RC and the right image R. The converted left image LC is generated based on the left image L. The converted left image LC has a grayscale value greater than a grayscale value of the left image L. The left image L has a grayscale value corresponding to an image to be viewed at a left eye of a viewer. The converted right image RC is generated based on the right image R. The converted right image RC has a grayscale value greater than a grayscale value of the right image R. The right image R has a grayscale value corresponding to an image to be viewed at a right eye of the viewer.

The panel driver 200 includes a frame rate converter 210, a timing controller 220, a gate driver 230 and a data driver 240.

The timing controller may include an ACC part 222 and a DCC part 224.

The ACC part 222 operates adaptive color correction to the first image data FRGB. The DCC part 224 operates dynamic capacitance compensation, which compensates a grayscale data of the current frame data using the previous frame data and the current frame data.

The timing controller 220 outputs two duplicated left images L and L and two duplicated right images R and R to the data driver 240.

The data driver 240 includes a grayscale converting part 241, a shift register 242, a latch 244, a signal processor 246 and a buffer 248.

The grayscale converting part 241 generates the converted left image LC having a grayscale value less than a grayscale value of the left image L based on the left image L. The grayscale converting part 241 generates the converted right image RC having a grayscale value less than the right image R based on the right image R.

In an exemplary embodiment of the invention, the grayscale converting part 241 may generate the converted left and right images LC and RC by multiplying the grayscale values of the left and right images L and R by a converting value. In such an embodiment, the converting value is less than one.

The converting value may be determined based on the grayscale values of the left and right images L and R.

In an exemplary embodiment of the invention, the grayscale converting part 241 may generate the converted left and right images LC and RC using a lookup table including the grayscale values corresponding to the grayscale values of the left and right images L and R.

The grayscale converting part 241 outputs the converted left image LC, the left image L, the converted right image RC and the right image R to the latch 244.

The shift register 242 outputs a latch pulse to the latch 244. The latch 244 temporally stores the converted left image LC, the left image L, the converted right image RC and the right image R and outputs the converted left image LC, the left image L, the converted right image RC and the right image R to the signal processor 246. The signal processor 246 converts the converted left image LC, the left image L, the converted right image RC and the right image R in a digital form to data voltages in an analog form based on the gamma reference voltages and outputs the data voltages to the buffer 248. The buffer 248 compensates the data voltages to have uniform levels and outputs the data voltages to the data lines DL.

According to an exemplary embodiment, a luminance of the display panel 100 increases, and a crosstalk of the 3D image is effectively prevented such that display quality of the 3D image is improved.

Figure 15:
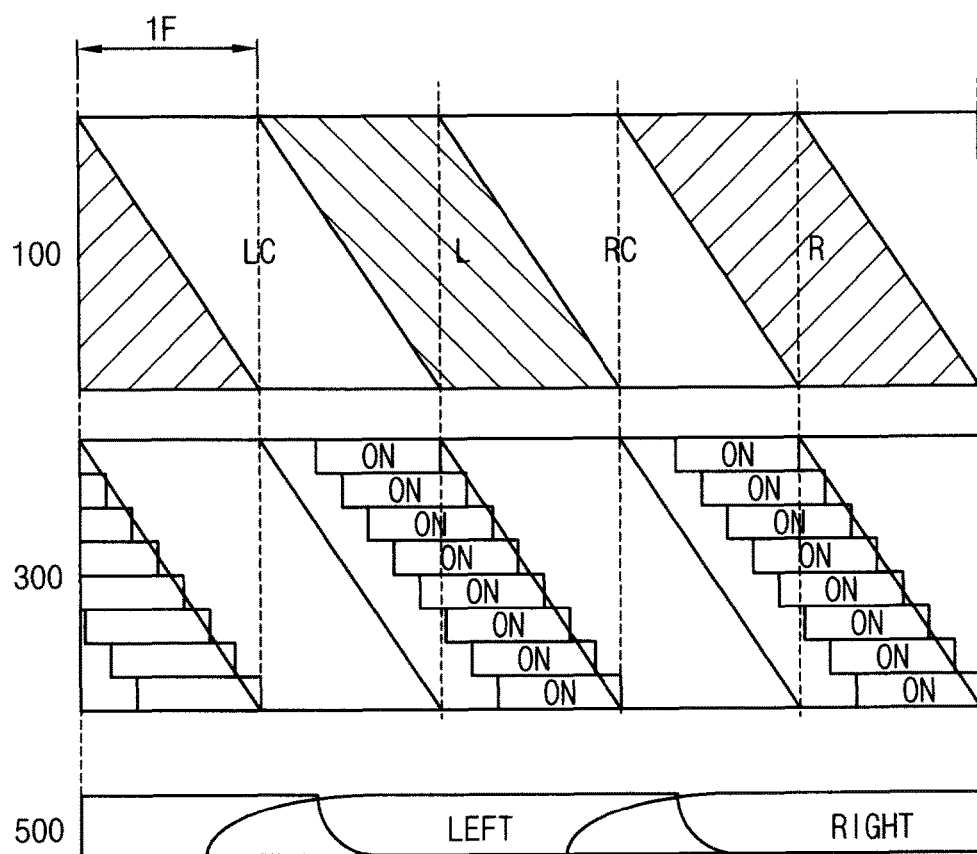
FIG. 15 is a conceptual diagram for explaining an exemplary embodiment of a method of displaying a 3D image using another alternative exemplary embodiment of a display apparatus.
Figure 16:
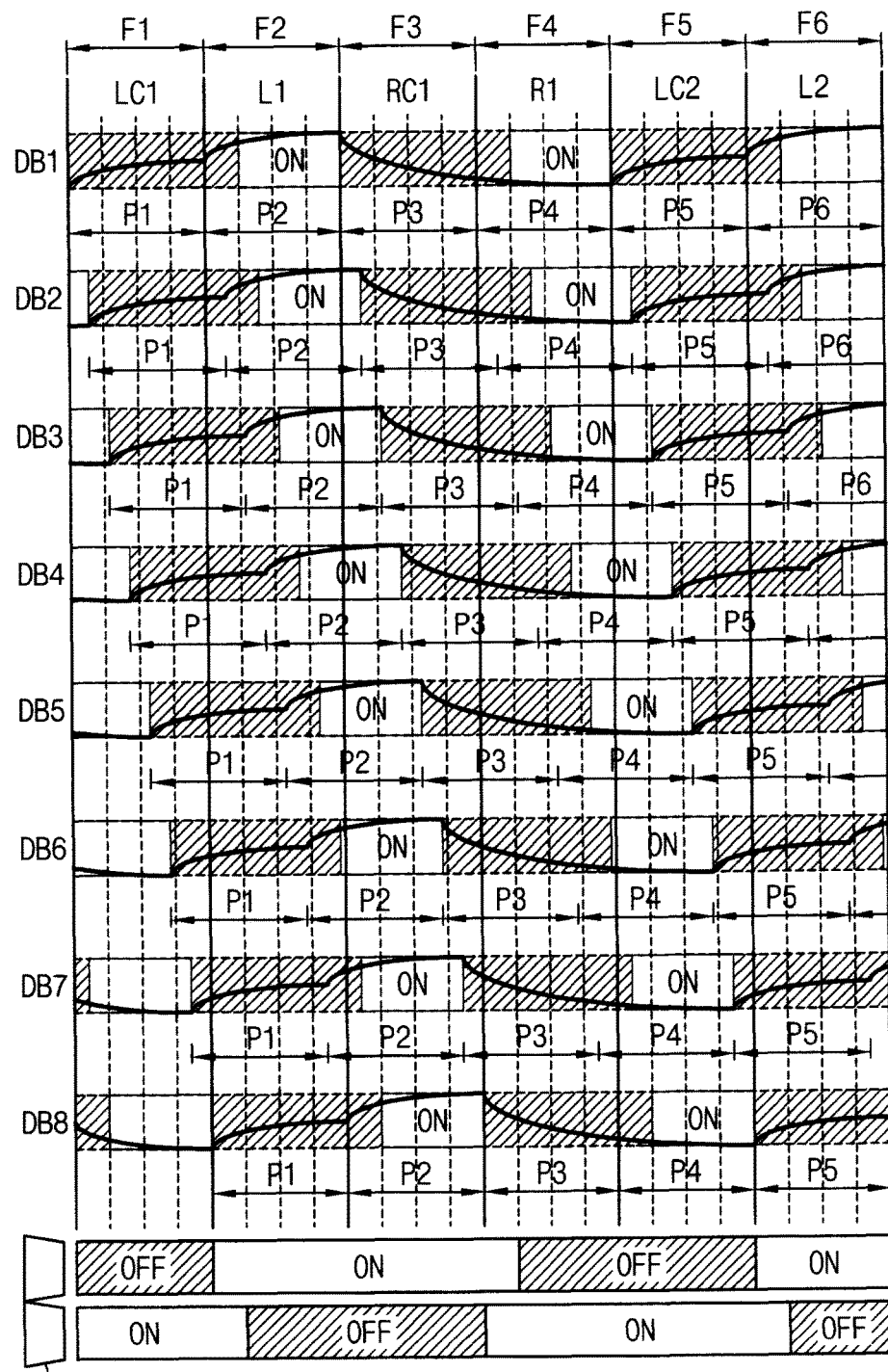
FIG. 16 is a signal timing diagram for explaining an exemplary embodiment of a method of displaying the 3D image using the display apparatus of FIG. 15.

FIG. 15 is a conceptual diagram for explaining an exemplary embodiment of a method of displaying a 3D image using another alternative exemplary embodiment of a display apparatus. FIG. 16 is a signal timing diagram for explaining an exemplary embodiment of a method of displaying the 3D image using the display apparatus of FIG. 15.

A display apparatus and a method of displaying the 3D image of FIGS. 14 and 15 is substantially the same as the display apparatus and the method of displaying the 3D image shown in FIGS. 1 to 6 except for a driving method of the light converting glasses 500. Thus, the same reference characters will be used to refer to the same or like elements as those described in the exemplary embodiment of FIGS. 1 to 6, and any repetitive detailed description thereof will be omitted or simplified.

Referring to FIGS. 1, 15 and 16, the display apparatus includes a display panel 100, a panel driver 200, a light source part 300, a light source driver 400 and light converting glasses 500.

The display panel 100, the light source part 300 and the light converting glasses 500 may be synchronized with one another.

The display panel 100 sequentially displays the converted left image LC, the left image L, the converted right image RC and the right image R. The converted left image LC is generated based on the left image L. The converted left image LC has a grayscale value less than a grayscale value of the left image L. The left image L has a grayscale value corresponding to an image to be viewed at a left eye of a viewer. The converted right image RC is generated based on the right image R. The converted right image RC has a grayscale value less than a grayscale value of the right image R. The right image R has a grayscale value corresponding to an image to be viewed at a right eye of the viewer.

Each of the converted left image LC, the left image L, the converted right image RC and the right image R is displayed on the pixel of the display panel 100 corresponding to a frame 1F.

The light source part 300 includes the light emitting blocks. The light emitting blocks are sequentially turned on along the scanning direction of the display panel 100. The light emitting blocks sequentially provide light to the display blocks of the display panel 100. In an exemplary embodiment, the display panel 100 includes eight display blocks, e.g., the first to eighth display blocks DB1 to DB8, and the light source part 300 includes eight light emitting blocks.

Open and close times of the light converting glasses 500 are adjusted corresponding to the left image L and the right image R. Both of a left glass 510 and a right glass 520 of the light converting glasses 500 may be turned on in a specific time point. The open time of the left glass 510 partially overlap the open time of the right glass 520.

In FIG. 16, the left glass 510 is turned on during a second frame F2, a third frame F3 and a beginning portion of a fourth frame F4 and a sixth frame F6. The right glass 520 is turned on during a first frame F1, a beginning portion of the second frame F2, the fourth frame F4, a fifth frame F5 and a beginning portion of the sixth frame F6. Thus, both of the left and right glasses 510 and 520 are turned on the beginning portion of the second frame F2, the beginning portion of the fourth frame F4 and the beginning portion of the sixth frame F6.

In such an embodiment, a luminance of the display panel 100 increases, and a crosstalk of the 3D image is effectively prevented such that display quality of the 3D image is improved.

Figure 17:
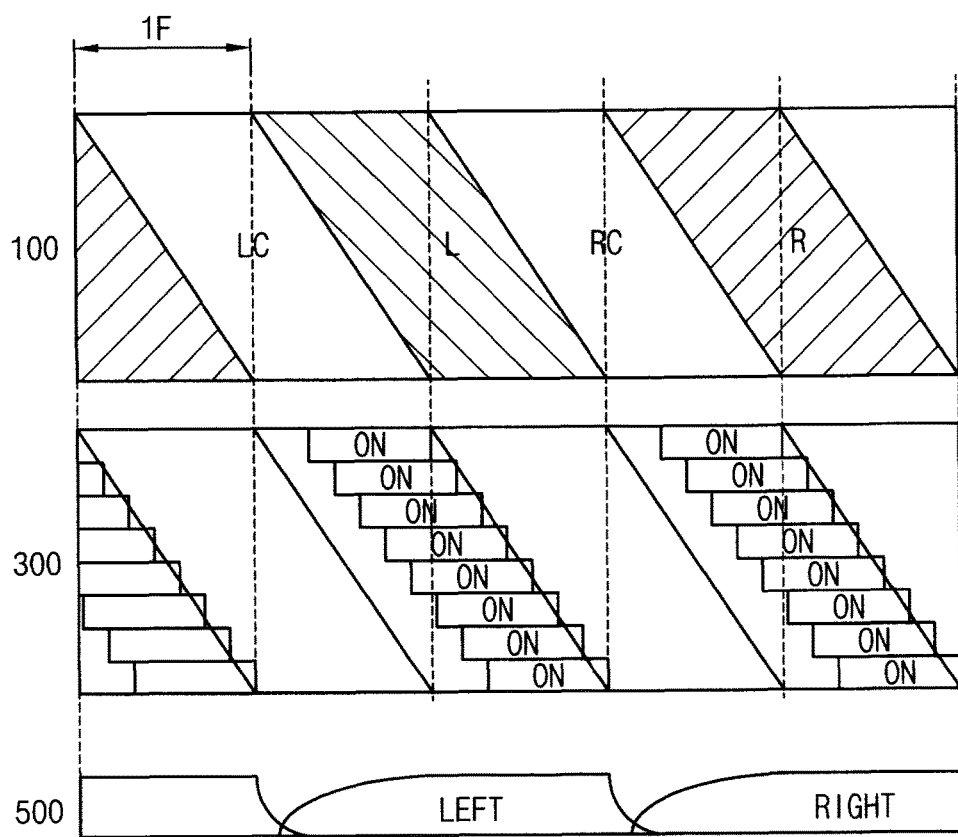
FIG. 17 is a conceptual diagram for explaining an exemplary embodiment of a method of displaying a 3D image using another alternative exemplary embodiment of a display apparatus.
Figure 18:
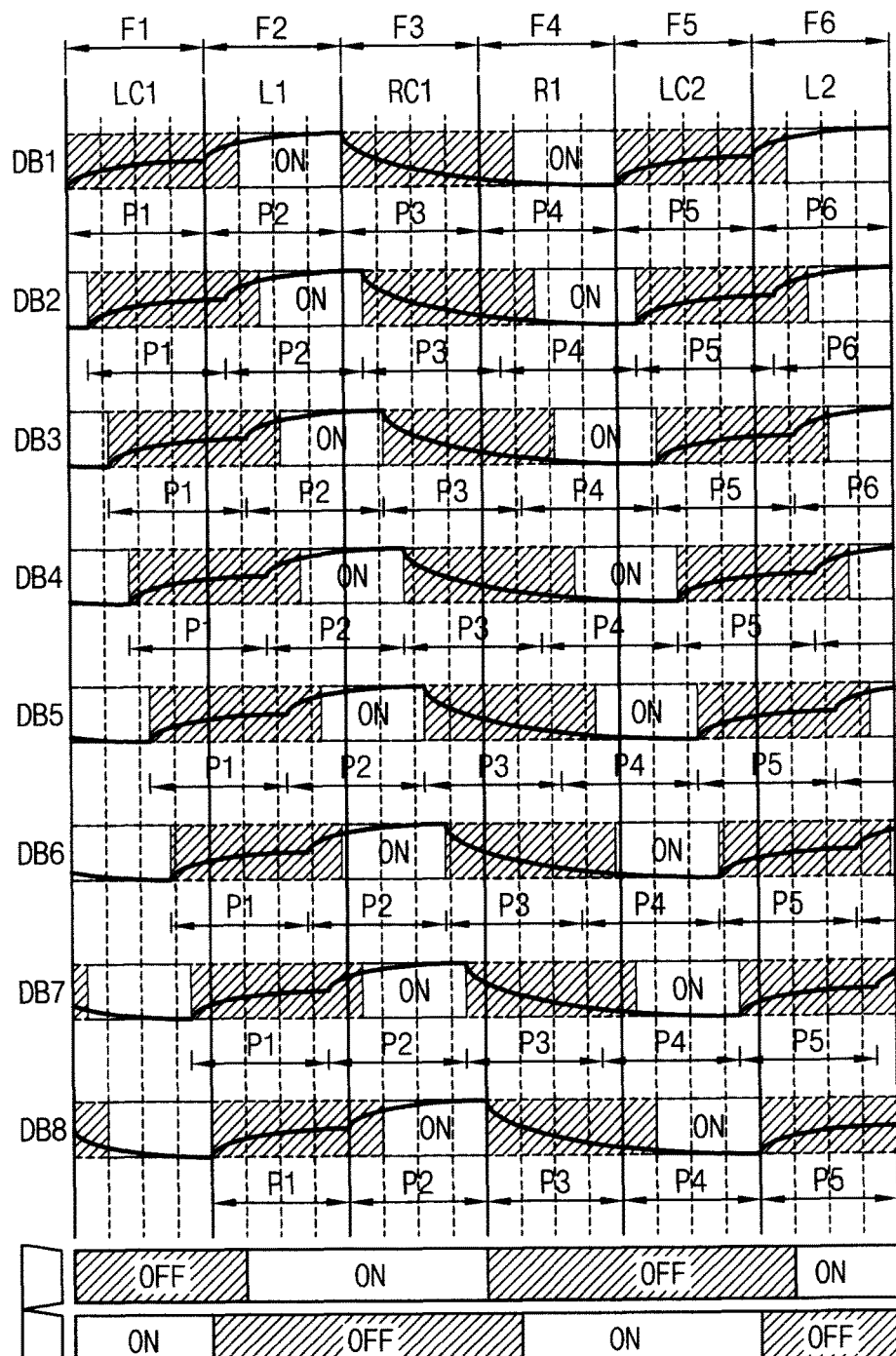
FIG. 18 is a signal timing diagram for explaining an exemplary embodiment of a method of displaying the 3D image using the display apparatus of FIG. 17.

FIG. 17 is a conceptual diagram for explaining an exemplary embodiment of a method of displaying a 3D image using another alternative exemplary embodiment of a display apparatus. FIG. 18 is a signal timing diagram for explaining an exemplary embodiment of a method of displaying the 3D image using the display apparatus of FIG. 17.

A display apparatus and a method of displaying the 3D image of FIG. 17 is substantially the same as the display apparatus and the method of displaying the 3D image of the exemplary embodiment explained referring to FIGS. 1 to 6 except for a driving method of the light converting glasses 500. Thus, the same reference characters will be used to refer to the same or like elements as those described in the exemplary embodiment of FIGS. 1 to 6, and any repetitive detailed description thereof will be omitted or simplified.

Referring to FIGS. 1, 17 and 18, the display apparatus includes a display panel 100, a panel driver 200, a light source part 300, a light source driver 400 and light converting glasses 500.

The display panel 100, the light source part 300 and the light converting glasses 500 may be synchronized with one another.

The display panel 100 sequentially displays the converted left image LC, the left image L, the converted right image RC and the right image R. The converted left image LC is generated based on the left image L. The converted left image LC has a grayscale value less than a grayscale value of the left image L. The left image L has a grayscale value corresponding to an image to be viewed at a left eye of a viewer. The converted right image RC is generated based on the right image R. The converted right image RC has a grayscale value less than a grayscale value of the right image R. The right image R has a grayscale value corresponding to an image to be viewed at a right eye of the viewer.

Each of the converted left image LC, the left image L, the converted right image RC and the right image R is displayed on the pixel of the display panel 100 corresponding to a frame 1F.

The light source part 300 includes the light emitting blocks. The light emitting blocks are sequentially turned on along the scanning direction of the display panel 100. The light emitting blocks sequentially provide light to the display blocks of the display panel 100. In an exemplary embodiment, the display panel 100 includes eight display blocks, e.g., the first to eighth display blocks DB1 to DB8, and the light source part 300 includes eight light emitting blocks.

Open and close times of the light converting glasses 500 are adjusted corresponding to the left image L and the right image R. Both of a left glass 510 and a right glass 520 of the light converting glasses 500 may be turned off in a specific time point. The close time of the left glass 510 partially overlap the close time of the right glass 520.

In FIG. 18, the left glass 510 is turned off during a first frame F1, a beginning portion of a second frame F2, a fourth frame F4, a fifth frame F5 and beginning portion of a sixth frame F6. The right glass 520 is turned off during the second frame F2, a third frame F3, a beginning portion of the fourth frame F4, the sixth frame F6. Thus, both of the left and right glasses 510 and 520 are turned off the beginning portion of the second frame F2, the beginning portion of the fourth frame F4 and the beginning portion of the sixth frame F6.

In such an embodiment, a luminance of the display panel 100 increases and a crosstalk of the 3D image is effectively prevented such that display quality of the 3D image is improved.

Figure 19:
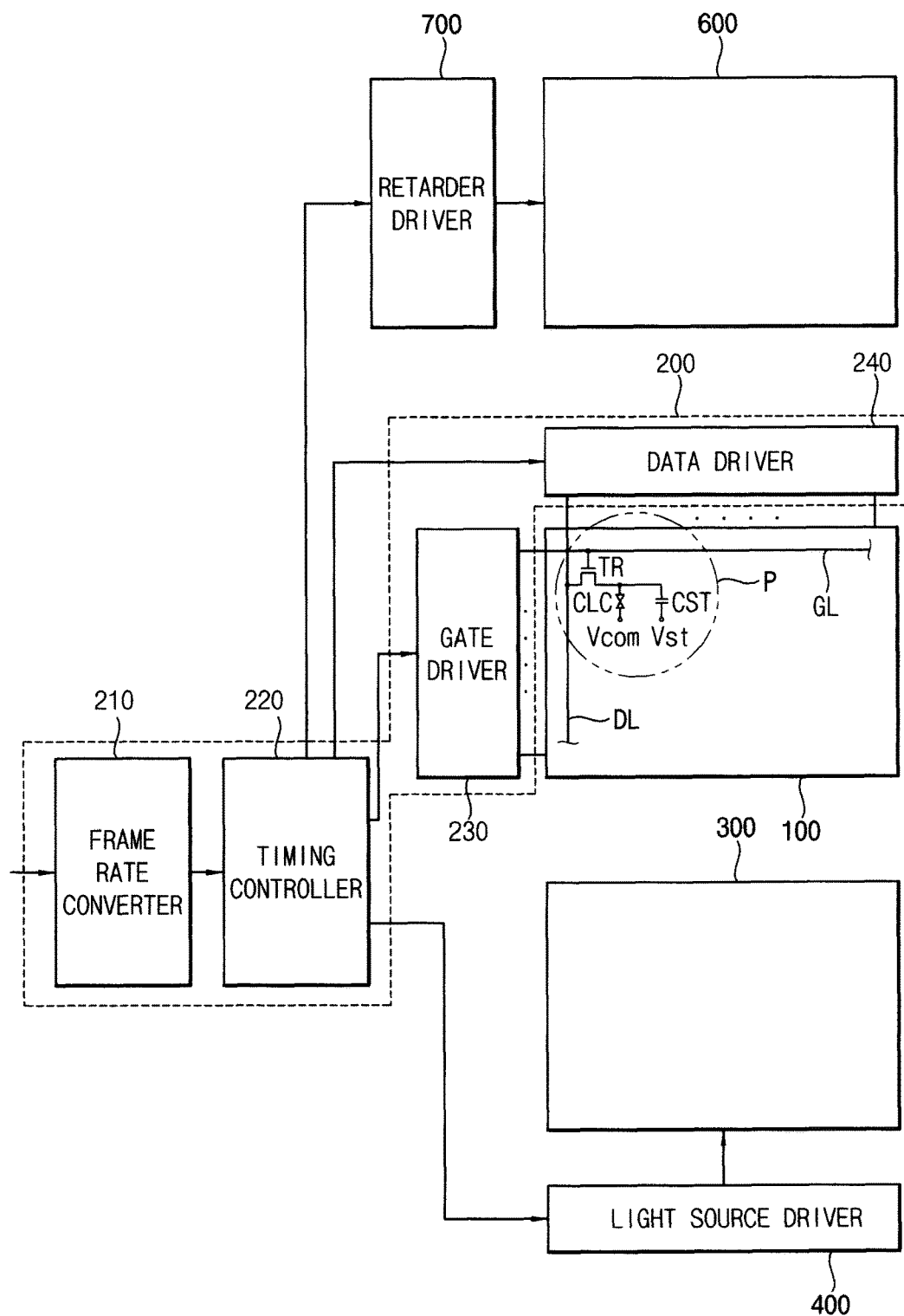
FIG. 19 is a block diagram illustrating an alternative exemplary embodiment of a display apparatus according to the invention.

FIG. 19 is a block diagram illustrating an alternative exemplary embodiment of a display apparatus according to the invention.

A display apparatus and a method of displaying the 3D image of FIG. 19 is substantially the same as the display apparatus and the method of displaying the 3D image shown in FIGS. 1 to 6 except that the display apparatus includes a retarder unit 600 as a light converting element. Thus, the same reference characters will be used to refer to the same or like elements as those described in the exemplary embodiment of FIGS. 1 to 6, and any repetitive detailed description thereof will be omitted or simplified.

Referring to FIGS. 19, the display apparatus includes a display panel 100, a panel driver 200, a light source part 300, a light source driver 400, a retarder unit 600 and a retarder driver 700.

The display panel 100 includes a plurality of pixels P which displays an image.

The panel driving part 200 includes a frame rate converter 210, a timing controller 220, a gate driver 230 and a data driver 240.

The frame rate converter 210 receives input image data RGB from an external apparatus (not shown). The frame rate converter 210 converts a frame rate of the input image data RGB to generate first image data FRGB. The frame rate converter 210 outputs the first image data FRGB to the timing controller 220.

In an exemplary embodiment, the timing controller 220 receives an input control signal from outside. In an alternative exemplary embodiment, the timing controller 220 may receive the input control signal from the frame rate converter 210.

The timing controller 220 generates a first control signal for controlling a driving timing of the gate driver 230, a second control signal for controlling a driving timing of the data driver 240 and a third control signal for controlling a driving timing of the light source driver 400.

The timing controller 220 outputs the first control signal to the gate driver 230. The timing controller 220 outputs the second control signal to the data driver 240. The timing controller 220 outputs the third control signal to the light source driver 400.

In such an embodiment, the timing controller 220 generates a retarder control signal for controlling the retarder unit 600 based on an image to be displayed on the display panel 100. The timing controller 220 outputs the retarder control signal to the retarder driver 700.

In an exemplary embodiment, the retarder unit is disposed on the display panel 100. The retarder unit selectively blocks the images on the display panel 100 such that the retarder unit converts a 2D image into a 3D image.

The retarder unit 600 may selectively blocks the images on the display panel 100 in response to the retarder control signal.

The display panel 100, the light source part 300 and the retarder unit 600 may be synchronized with one another.

The display panel 100 sequentially displays the converted left image LC, the left image L, the converted right image RC and the right image R. The converted left image LC is generated based on the left image L. The converted left image LC has a grayscale value less than a grayscale value of the left image L. The left image L has a grayscale value corresponding to an image to be viewed at a left eye of a viewer. The converted right image RC is generated based on the right image R. The converted right image RC has a grayscale value less than a grayscale value of the right image R. The right image R has a grayscale value corresponding to an image to be viewed at a right eye of the viewer.

Each of the converted left image LC, the left image L, the converted right image RC and the right image R is displayed on the pixel of the display panel 100 corresponding to a frame 1F.

The light source part 300 includes the light emitting blocks. The light emitting blocks are sequentially turned on along the scanning direction of the display panel 100. The light emitting blocks sequentially provide light to the display blocks of the display panel 100. In an exemplary embodiment, the display panel 100 includes eight display blocks, e.g., the first to eight display blocks DB1 to DB8, and the light source part 300 includes eight light emitting blocks.

In an exemplary embodiment of the invention, the display apparatus may further include light converting glasses including a left glass and a right glass. The retarder unit 600 may polarize the left image L such that the polarized left image L transmits the left glass when the display panel 100 displays the left image L. The retarder unit 600 may polarize the right image R such that the polarized right image R transmits the right glass when the display panel 100 displays the right image R.

An arrangement of retarders in the retarder unit 600 may be adjusted corresponding to the left image L and the right image R.

In such an embodiment, a luminance of the display panel 100 increases and a crosstalk of the 3D image is effectively such that display quality of the 3D image is improved.

According to exemplary embodiments of the invention described herein, the display panel displays the converted left image and the converted right image such that a crosstalk of the 3D image is effectively prevented and a luminance of the display panel increases such that display quality of the 3D image is improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of displaying a three-dimensional image, the method comprising:
   outputting a converted left image generated based on a left image to a pixel of a display panel during a first period, wherein the converted left image has a grayscale value only less than a corresponding grayscale value of the left image;
   outputting the left image to the pixel of the display panel during a second period which immediately follows the first period;
   outputting a converted right image generated based on a right image to the pixel of the display panel during a third period, wherein the converted right image has a grayscale value only less than a corresponding grayscale value of the right image; and
   outputting the right image to the pixel of the display panel during a fourth period which immediately follows the third period,
   wherein the converted left image is outputted to all of pixels of the display panel during the first period and the left image is outputted to all of the pixels of the display panel during the second period so that a length of the first period is same as a length of the second period, and wherein the converted right image is outputted to all of the pixels of the display panel during the third period and the right image is outputted to all of the pixels of the display panel during the fourth period so that a length of the third period is same as a length of the fourth period.

2. The method of claim 1, further comprising:
sequentially providing light to a plurality of display blocks of the display panel along a scanning direction of the display blocks.

3. The method of claim 2, wherein the sequentially providing the light to the display blocks comprises:
temporally providing the light in the second period; and
temporally providing the light in the fourth period.

4. The method of claim 1, further comprising:
adjusting an operation of a light converting element of the display panel based on the left image and the right image,
wherein the light converting element selectively blocks light corresponding to the left image and the right image.

5. The method of claim 4, wherein the light converting element comprises light converting glasses.

6. The method of claim 4, wherein the light converting element comprises a retarder unit disposed on the display panel.

7. The method of claim 1, wherein the converted left and right images are generated by multiplying the grayscale values of the left and right images by a converting value.

8. The method of claim 7, wherein the converting value is determined based on the grayscale values of the left and right images.

9. The method of claim 1, wherein the converted left and right images are generated using a lookup table including a plurality of grayscale values corresponding to the grayscale values of the left and right images.

10. A method of displaying a three-dimensional image, the method comprising:
outputting a converted left image generated based on a left image to a pixel of a display panel during a first period, wherein the converted left image has a grayscale value only greater than a corresponding grayscale value of the left image;
outputting the left image to the pixel of the display panel during a second period which immediately follows the first period;
outputting a converted right image generated based on a right image to the pixel of the display panel during a third period, wherein the converted right image has a grayscale value only greater than a corresponding grayscale value of the right image; and
outputting the right image to the pixel of the display panel during a fourth period which immediately follows the third period,
wherein the converted left image is outputted to all of pixels of the display panel during the first period and the left image is outputted to all of the pixels of the display panel during the second period so that a length of the first period is same as a length of the second period, and
wherein the converted right image is outputted to all of the pixels of the display panel during the third period and the right image is outputted to all of the pixels of the display panel during the fourth period so that a length of the third period is same as a length of the fourth period.

11. The method of claim 10, further comprising:
sequentially providing light to a plurality of display blocks of the display panel along a scanning direction of the display blocks.

12. The method of claim 11, wherein the sequentially providing the light to the display blocks comprises:
temporally providing the light in the second period; and
temporally providing the light in the fourth period.

13. The method of claim 10, further comprising:
adjusting an operation of a light converting element based on the left image and the right image,
wherein the light converting element selectively blocks light corresponding to the left image and the right image.

14. The method of claim 13, wherein the light converting element comprises light converting glasses.

15. A method of displaying a three-dimensional image, the method comprising:
outputting a left image to a pixel of a display panel during a first period;
outputting a converted left image generated based on the left image to the pixel of the display panel during a second period which immediately follows the first period, wherein the converted left image has a grayscale value only less than a corresponding grayscale value of the left image;
outputting a right image to the pixel of the display panel during a third period; and
outputting a converted right image generated based on the right image to the pixel of the display panel during a fourth period which immediately follows the third period, wherein the converted right image has a grayscale value only less than a corresponding grayscale value of the right image,
wherein the converted left image is outputted to all of pixels of the display panel during the second period and the left image is outputted to all of the pixels of the display panel during the first period so that a length of the first period is same as a length of the second period, and
wherein the converted right image is outputted to all of the pixels of the display panel during the fourth period and the right image is outputted to all of the pixels of the display panel during the third period so that a length of the third period is same as a length of the fourth period.

16. The method of claim 15, further comprising:
sequentially providing light to a plurality of display blocks of the display panel along a scanning direction of the display blocks.

17. The method of claim 16, wherein the sequentially providing the light to the display blocks comprises:
temporally providing the light in an ending portion of the first period and a beginning portion of the second period; and
temporally providing the light in an ending portion of the third period and a beginning portion of the fourth period.

18. The method of claim 15, further comprising:
adjusting an operation of a light converting element of the display panel based on the left image and the right image,
wherein the light converting element selectively blocks light corresponding to the left image and the right image.

19. The method of claim 18, wherein the light converting element comprises light converting glasses.

20. A display apparatus comprising:
a display panel including a pixel; and
a panel driver which outputs a converted left image generated based on a left image to the pixel of the display panel during a first period, outputs the left image to the pixel of the display panel during a second period which immediately follows the first period, outputs a converted right image generated based on a right image to the pixel of the display panel during a third period, and outputs the right image to the pixel of the display panel during a fourth period which immediately follows the third period,
wherein the converted left image has a grayscale value only less than a corresponding grayscale value of the left image, and the converted right image has a grayscale value only less than a corresponding grayscale value of the right image,
wherein the converted left image is outputted to all of pixels of the display panel during the first period and the left image is outputted to all of the pixels of the display panel during the second period so that a length of the first period is same as a length of the second period, and
wherein the converted right image is outputted to all of the pixels of the display panel during the third period and the right image is outputted to all of the pixels of the display panel during the fourth period so that a length of the third period is same as a length of the fourth period.

21. The display apparatus of claim 20, further comprising:
a light source part which provides light to the display panel,
wherein the display panel includes a plurality of display blocks, and
wherein the light source part sequentially provides the light to the display blocks of the display panel along a scanning direction of the display blocks.

22. The display apparatus of claim 21, wherein the light source part temporally provides the light in the second period and temporally provides the light in the fourth period.

23. The display apparatus of claim 20, further comprising:
a light converting element which selectively blocks light corresponding to the left image and the right image.

24. The display apparatus of claim 23, wherein the light converting element comprises light converting glasses.

25. The display apparatus of claim 23, wherein the light converting element comprises a retarder unit disposed on the display panel.

26. The display apparatus of claim 20, wherein the panel driver generates the converted left and right images by multiplying the grayscale values of the left and right images by a converting value.

27. The display apparatus of claim 26, wherein the converting value is determined based on the grayscale values of the left and right images.

28. The display apparatus of claim 20, wherein the panel driver generates the converted left and right images using a lookup table including a plurality of grayscale values corresponding to the grayscale values of the left and right images.

29. The display apparatus of claim 20, wherein the panel driver includes a timing controller generating the converted left and right images.

30. The display apparatus of claim 20, wherein the panel driver comprises a data driver which generates the converted left and right images.

31. A display apparatus comprising:
a display panel including a pixel; and
a panel driver which outputs a converted left image generated based on a left image to the pixel of the display panel during a first period, outputs the left image to the pixel of the display panel during a second period which immediately follows the first period, outputs a converted right image generated based on a right image to the pixel of the display panel during a third period, and outputs the right image to the pixel of the display panel during a fourth period which immediately follows the third period, wherein the converted left image has a grayscale value only greater than a corresponding grayscale value of the left image, and the converted right image has a grayscale value only greater than a corresponding grayscale value of the right image,
wherein the converted left image is outputted to all of pixels of the display panel during the first period and the left image is outputted to all of the pixels of the display panel during the second period so that a length of the first period is same as a length of the second period, and
wherein the converted right image is outputted to all of the pixels of the display panel during the third period and the right image is outputted to all of the pixels of the display panel during the fourth period so that a length of the third period is same as a length of the fourth period.

32. The display apparatus of claim 31, further comprising:
a light source part which provides light to the display panel,
wherein the display panel includes a plurality of display blocks, and
the light source part sequentially provides the light to the display blocks of the display panel along a scanning direction of the display blocks.

33. The display apparatus of claim 32, wherein the light source part temporally provides the light in the second period and temporally provides the light in the fourth period.

34. The display apparatus of claim 31, further comprising:
a light converting element which selectively blocks light corresponding to the left image and the right image.

35. The display apparatus of claim 34, wherein the light converting element comprises light converting glasses.

36. A display apparatus comprising:
a display panel including a pixel; and
a panel driver which outputs a left image to the pixel of the display panel during a first period, outputs a converted left image generated based on the left image to the pixel of the display panel during a second period which immediately follows the first period, outputs a right image to the pixel of the display panel during a third period, and outputs a converted right image generated based on the right image to the pixel of the display panel during a fourth period which immediately follows the third period,
wherein the converted left image has a grayscale value only less than a corresponding grayscale value of the left image, and the converted right image has a grayscale value only less than a corresponding grayscale value of the right image,
wherein the converted left image is outputted to all of pixels of the display panel during the second period and the left image is outputted to all of the pixels of the display panel during the first period so that a length of the first period is same as a length of the second period, and wherein the converted right image is outputted to all of the pixels of the display panel during the fourth period and the right image is outputted to all of the pixels of the display panel during the third period so that a length of the third period is same as a length of the fourth period.

37. The display apparatus of claim 36, further comprising:
a light source part which provides light to the display panel,
wherein the display panel includes a plurality of display blocks, and
wherein the light source part sequentially provides the light to the display blocks of the display panel along a scanning direction of the display blocks.

38. The display apparatus of claim 37, wherein the light source part temporally provides the light in an ending portion of the first period and a beginning portion of the second period and temporally provides the light in an ending portion of the third period and a beginning portion of the fourth period.

39. The display apparatus of claim 36, further comprising:
a light converting element which selectively blocks light corresponding to the left image and the right image.

40. The display apparatus of claim 39, wherein the light converting element comprises light converting glasses.

41. A display apparatus comprising:
a display panel including a pixel; and
a panel driver which applies one of left and right images to the pixel during a second period and applies a converted image of the one of the left and right images to the pixel during a first period prior to the second period which immediately follows the first period,
wherein the converted image of the one of the left and right images has a grayscale value only less than a corresponding grayscale value of the one of the left and right images, and
wherein the converted image of the one of the left and right images is outputted to all of pixels of the display panel during the first period and one of the left and right images is outputted to all of the pixels of the display panel during the second period so that a length of the first period is same as a length of the second period.

42. The display apparatus of claim 41, wherein the panel driver generates the converted image by multiplying the grayscale value of the one of the left and right images by a converting value.

43. The display apparatus of claim 42, wherein the converting value is determined based on the grayscale value of the one of the left and right images.

44. The display apparatus of claim 41, wherein the panel driver generates the converted image of the one of the left and right images using a lookup table which stores a grayscale value corresponding to the grayscale value of the one of the left and right images.

45. The display apparatus of claim 41, further comprising:
a light source part which provides light to the display panel; and
a light source driver which drives the light source part.

46. The display apparatus of claim 45, wherein
the light source driver is connected to the panel driver, and
the light source driver drives the light source part synchronized with an image displayed on the display panel.

47. The display apparatus of claim 46, wherein
the light source part comprises a plurality of light emitting blocks, and
the light emitting blocks are sequentially driven along a scanning direction of the image displayed on the display panel.

48. The display apparatus of claim 41, further comprising:
a light converting element which selectively or totally blocks light corresponding to one of the left image and the right image.

49. The display apparatus of claim 48, wherein the light converting element includes light converting glasses.

50. The display apparatus of claim 48, wherein the light converting element includes a retarder unit disposed on the display panel.

51. A display apparatus comprising:
a display panel including a pixel; and
a panel driver which applies one of left and right images to the pixel during a second period and applies a converted image of the one of the left and right images to the pixel during a first period prior to the second period which immediately follows the first period,
wherein the converted image has a grayscale value only greater than a corresponding grayscale value of the one of the left and right images, and
wherein the converted image of the one of the left and right images is outputted to all of pixels of the display panel during the first period and one of the left and right images is outputted to all of the pixels of the display panel during the second period so that a length of the first period is same as a length of the second period.

52. The display apparatus of claim 51, wherein the panel driver generates the converted image by multiplying the grayscale value of the one of the left and right images by a converting value.

53. The display apparatus of claim 52, wherein the converting value is determined based on the grayscale value of the one of the left and right images.

54. The display apparatus of claim 51, wherein the panel driver generates the converted image using a lookup table which stores a grayscale value corresponding to the grayscale value of the one of the left and right images.

55. The display apparatus of claim 51, further comprising:
a light source part which provides light to the display panel; and
a light source driver which drives the light source part.

56. The display apparatus of claim 55, wherein the light source driver is connected to the panel driver, and
the light source driver drives the light source part synchronized with an image displayed on the display panel.

57. The display apparatus of claim 56, wherein the light source part includes a plurality of light emitting blocks, and
the light emitting blocks are sequentially driven along a scanning direction of the image displayed on the display panel.

58. The display apparatus of claim 51, further comprising:
a light converting element which selectively or totally blocks light corresponding to the one of the left and the right images.

59. The display apparatus of claim 58, wherein the light converting element comprises light converting glasses.

60. The display apparatus of claim 58, wherein the light converting element comprises a retarder unit disposed on the display panel.

* * * * *